United States Patent [19]
Ishizu

[11] Patent Number: 6,002,979
[45] Date of Patent: Dec. 14, 1999

[54] TRACTION CONTROL SYSTEM FOR AUTOMOTIVE VEHICLES

[75] Inventor: Takeshi Ishizu, Kanagawa, Japan

[73] Assignee: Nissan Motor Co., Ltd., Yokohama, Japan

[21] Appl. No.: 08/800,684

[22] Filed: Feb. 14, 1997

[30] Foreign Application Priority Data

Feb. 16, 1996 [JP] Japan .................................. 8-029395
Apr. 22, 1996 [JP] Japan .................................. 8-100340

[51] Int. Cl.⁶ .................................................. B60K 28/00
[52] U.S. Cl. ............................ 701/86; 701/70; 701/84; 180/197
[58] Field of Search ......................... 701/86, 84, 70; 180/197; 123/198 DB

[56] References Cited

U.S. PATENT DOCUMENTS 5,168,952  12/1992  Oono et al. ............................ 180/197
5,265,693  11/1993  Rees et al. ............................. 180/197

FOREIGN PATENT DOCUMENTS 6-8756  1/1994  Japan .

*Primary Examiner*—William A. Cuchlinski, Jr.
*Assistant Examiner*—Yonel Beaulieu
*Attorney, Agent, or Firm*—Foley & Lardner

[57] ABSTRACT

An automobile traction control system includes a traction control unit for calculating a slip amount as the difference between a drive-wheel speed and a target drive-wheel speed, an engine control unit cooperating with a fuel-supply system for decreasingly compensating the engine power by the fuel-out control action in response to the slip amount, and a temperature sensor for detecting an internal combustion engine temperature. The traction control unit is responsive to the internal combustion engine temperature for properly setting the target drive-wheel speed or for properly setting control gains of the engine control system so that the engine speed is maintained above a minimum internal combustion engine revolution speed at which engine stall is prevented.

10 Claims, 10 Drawing Sheets

TRACTION CONTROL SYSTEM FOR AUTOMOTIVE VEHICLES

BACKGROUND OF THE INVENTION

1. Field of the Invention

The present invention relates to a traction control system for automotive vehicles, and specifically to a system which is capable of adjusting a driving force (a driving torque) delivered to each of drive road wheels by engine-power adjustment such as temporarily stopping fuel supply to the engine or decreasing the fuel-supply amount to the engine.

2. Description of the Prior Art

In case that the friction coefficient of the road surface is lower than a value that the driver imagines when accelerating, drive wheels tend to slip unintendedly, and thus adequate acceleration performance and high driving stability cannot be obtained. To avoid this, in modern vehicles a traction control system is often provided to properly adjust traction acting between the tire installed on the drive wheel and the road surface, depending on the fiction coefficient $\mu$ of the road surface. In order to suppress undesired slip (often called acceleration slip) of drive wheels, recently there have been proposed and developed various traction control systems. As is generally known, there are several controlled objects (or several controlled variables) with regard to which a traction control can be performed. In one, a braking-force adjustment type traction control system uses a wheel-brake cylinder pressure controlling actuator through which a driving force applied to drive wheels is properly reduced by actively or forcibly increasing the wheel-brake cylinder pressure. Such a braking-force adjustment type traction control system is superior in terms of a responsiveness of the driving-force control. However the braking-force adjustment type traction control system is inferior to others, in terms of the durability of brake parts i.e., friction elements such as brake pads, brake shoes or the like, because the wheel-brake cylinder is actuated every occurrences of so-called acceleration-slip. In another, a throttle-control type traction control system uses a throttle-opening control actuator through which the throttle opening of the throttle valve provided in the induction system is properly adjusted to decreasingly compensate the output power of the engine directly. However, in such a throttle-control type traction control system, even if the throttle is fully closed, a braking force (called a back torque) applied to the drive wheels due to engine braking can be increasingly adjusted only to a level equivalent to the engine idle speed, and thus the driving force applied to the drive wheels cannot be satisfactorily and rapidly reduced. Therefore such a throttle-control type traction control system is inferior to others from the viewpoint of a responsiveness of the traction control. In more later models with an engine which is designed to electronically control combustion (burning condition of air-fuel mixture in the engine cylinder), fuel-supply itself would be properly controlled so that the fuel-supply is temporarily stopped or decreased in designated cylinders of all engine cylinders to provide a sufficient back torque rapidly. Such a traction control system will be hereinbelow referred to as a "fuel-supply control type traction control system". For instance, in case of an engine which has a plurality of cylinders and in which the injections to the respective engine cylinders are electronically controlled or timed independently of each other, a calculated slip ratio is firstly derived from a target drive-wheel speed as the difference between the actual drive-wheel speed and the target drive-wheel speed, and the number of so-called fuel-cut cylinders is determined depending on the calculated slip ratio (corresponding to the desired decrement in driving force to be applied to the drive wheels) and simultaneously the cylinder number of at least one particular engine cylinder that be subjected to fuel-cut control action is determined. In this manner, the fuel-supply to the particular engine cylinders is stopped or cut temporarily to produce an adequate back torque timely and consequently to rapidly suppress or prevent acceleration-slip at the drive wheels. In such a fuel-supply control type traction control system, the previously-noted target drive-wheel speed is generally set at a value equivalent to a driven-wheel speed during constant-speed driving at a speed higher than a predetermined value, and set at or fixed at a preset value when the vehicle speed is lower than the predetermined value, for example when the vehicle begins to run. In vehicles with the previously-noted fuel-supply control type traction control system, in the event that the target drive-wheel speed is adjusted toward the driven-wheel speed (corresponding to a front-wheel speed in case of rear-wheel-drive vehicles) during the constant-speed driving at a speed above the predetermined value and as a result the drive-wheel speed becomes identical to the driven-wheel speed by way of forcible fuel-cut control action or decreasing control action in fuel-supply, there is no risk of stalling the engine, because the engine runs at comparatively high engine revolution speeds with great rotational inertia of rotating parts of the vehicle. On the other hand, in the event that the target drive-wheel speed is fixed at a preset value when the vehicle starts to run, the smaller the preset value, the greater the slip amount (or the slip velocity) calculated as the difference between the actual drive-wheel speed and the target drive-wheel speed, thus increasing the number of fuel-cut engine cylinders and consequently increasing an estimated value of the so-called back torque. When starting, a comparatively small preset value of the target drive-wheel speed is effective to rapidly and adequately suppress or prevent acceleration-slip at the drive wheels. But, if the preset value of the target drive-wheel speed is set at or fixed at an excessively small value, when the drive-wheel speed is adjusted toward and reaches the excessively small preset value with a high response, there is a possibility of engine-stall, since the engine revolution speed may drop down to a value remarkably less than the engine idle speed. Therefore, the previously-discussed preset value (the fixed value) of the target drive-wheel speed is conventionally set at a predetermined value above an idle speed at which the engine is warm and the engine runs without load with the accelerator pedal released. During the warm-engine idling, the operating temperature of the engine has been maintained within a steady state and the temperature of engine coolant has risen adequately. In contrast, when the engine is cold and the engine runs without load with the accelerator pedal released, the viscosity coefficient of lubricant (i.e., engine oil supplied to moving engine parts) is high and thus there is a great friction loss (power loss from friction) owing to a high viscous resistance. During such cold-engine idling in which the engine does not yet reach the operating temperature, it is necessary to adjust the idle speed toward a greater value to avoid undesired engine stall. The above-mentioned vehicle with an engine which is designed to electronically control a combusting condition of each of the engine cylinders, of course maintains the idle speed at a desired value by properly adjusting an opening of the idle valve or an amount of fuel fed through the injection system depending on the coolant temperature and thus by properly decreasing the air-fuel ratio so as to compensate the air-fuel mixture richer. As set out above, in conventional engines with an electronic combustion control system, the engine idle speed is usually preselected as a minimum engine revolution speed (or a minimum internal-combustion-engine revolution speed), based on the coolant temperature. Thus, in the case that the conventional fuel-supply control type traction control system comes into operation owing to wheel-slip which may take place at the drive wheels when starting with the cold engine, the drive-wheel speed is firstly adjusted toward the target drive-wheel speed (i.e., the preset value fixed at a specified value equal to or somewhat greater than the warm-engine idle speed) of the target drive-wheel speed. During the instantaneous adjustment of the drive-wheel speed, the engine speed tends to become less than the minimum engine revolution speed, since the warm-engine idle speed is less than the desired idle speed which is determined on the basis of the engine coolant temperature during cold-engine idling, and therefore there is a possibility of engine-stall when starting with the cold engine. To avoid engine-stall when starting with the cold engine, in the electronically-controlled internal combustion engine with the fuel-supply control type traction control system, in the event that the engine speed becomes less than the minimum engine revolution speed based on the coolant temperature, the engine control system operates to cancel the fuel-cut requirement to rapidly recover combustion in the respective engine cylinders. Rapid recovery from the fuel-cut state to the combusting state produces a rapid rise in the drive-wheel speed, and as a result the traction control system may often decide to initiate the fuel-cut control action irrespective of decrease in the slip ratio of the drive wheels. Thereafter, the engine control system itself may often operate to cancel again the fuel-cut requirement for the purpose of recovering to the combusting state. In this manner, when the fuel-cut control action and the recovery to the combusting state (the fuel-delivery to all of the engine cylinders through the injectors) are repeatedly executed owing to positive and negative fluctuations in the drive-wheel speed with respect to a desired value (the target drive-wheel speed fixed at the specified value), it is not easy to converge the drive-wheel speed on the desired value. Such undesirable hunting (fluctuations or oscillation in the drive-wheel speed) may result in unstable behavior of the vehicle particularly during traction control when starting with the cold engine.

SUMMARY OF THE INVENTION

Accordingly, it is an object of the present invention to provide an automobile traction control system which avoids the aforementioned disadvantages of the prior art. That is, an object of the invention is to provide a traction control system which can attain a proper convergence of the drive-wheel speed to a desired value by suppressing or preventing repetition of fuel-cut and fuel-supply recovery control actions to insure a stable behavior of the vehicle during the traction control based on fuel-supply adjustment.

In order to accomplish the aforementioned and other objects of the present invention, an automobile traction control system in combination with a fuel-supply system for adjusting an engine power by a fuel-cut control action or a decrease in a fuel-supply amount, comprises means for monitoring a slipping condition of a drive wheel with respect to a target drive-wheel speed, engine control means cooperating with the fuel-supply system for decreasing the engine power by the fuel-cut control action or the decrease in the fuel-supply amount delivered to an internal combustion engine in response to the slipping condition, sensor means for detecting an internal combustion engine temperature, and means responsive to the internal combustion engine temperature for setting the target drive-wheel speed necessary to attain a minimum internal combustion engine revolution speed at which there is no risk of engine stall, whereby the engine stall is prevented when a speed of the drive wheel falls to the target drive-wheel speed.

According to another aspect of the invention, an automobile traction control system in combination with a fuel-supply system for adjusting an engine power by a fuel-cut control action or a decrease in a fuel-supply amount, comprises means for monitoring a slipping condition of a drive wheel with respect to a target drive-wheel speed, engine control means cooperating with the fuel-supply system for decreasing the engine power by the fuel-cut control action or the decrease in the fuel-supply amount delivered to an internal combustion engine in response to the slipping condition, sensor means for detecting an internal combustion engine temperature, and means responsive to the internal combustion engine temperature for setting at least one control gain of the engine control means, the control gain being necessary to attain a minimum internal combustion engine revolution speed at which there is no risk of engine stall, wherein the control gain is set to increase essentially in response to an increase in the internal combustion engine temperature, whereby the fuel-supply amount to engine cylinders is increased during cold-engine operating period in comparison with during warm-engine operating period.

According to a further aspect of the invention, an automobile traction control system in combination with a fuel-supply system for adjusting an engine power by a fuel-cut control action, comprises means for monitoring a drive-wheel speed, means for calculating a slip amount of the drive wheel as a difference between the drive-wheel speed and a target drive-wheel speed, engine control means cooperating with the fuel-supply system for decreasingly compensating the engine power in response to a target number of fuel-cut cylinders which is subjected to the fuel-cut control action, sensor means for detecting an internal combustion engine temperature, computation means for computing the target number of fuel-cut cylinders through a proportional plus derivative control action based on the slip amount and a differentiated value of the slip amount, and means responsive to the internal combustion engine temperature for setting the target drive-wheel speed necessary to attain a minimum internal combustion engine revolution speed at which there is no risk of engine stall, whereby the engine stall is prevented when a speed of the drive wheel falls to the target drive-wheel speed.

According to a still further aspect of the invention, an automobile traction control system in combination with a fuel-supply system for adjusting an engine power by a fuel-cut control action, comprises means for monitoring a drive-wheel speed, means for calculating a slip amount of the drive wheel as a difference between the drive-wheel speed and a target drive-wheel speed, engine control means cooperating with the fuel-supply system for decreasingly compensating the engine power in response to a target number of fuel-cut cylinders which is subjected to the fuel-cut control action, sensor means for detecting an internal combustion engine temperature, computation means for computing the target number of fuel-cut cylinders through a proportional plus derivative control action based on the slip amount and a differentiated value of the slip amount, means responsive to the internal combustion engine temperature for setting a proportional gain for the slip amount and a differential gain for the differentiated value of the slip amount, the proportional gain and the differential gain being necessary to attain a minimum internal combustion engine revolution speed at which there is no risk of engine stall, wherein the proportional gain is set to increase essentially in response to an increase in the internal combustion engine temperature, whereby the target number of fuel-cut cylinders is reduced during cold-engine operating period in comparison with during warm-engine operating period.

It is preferable that the internal combustion engine temperature is an engine coolant temperature.

DESCRIPTION OF THE PREFERRED EMBODIMENTS

Figure 1:
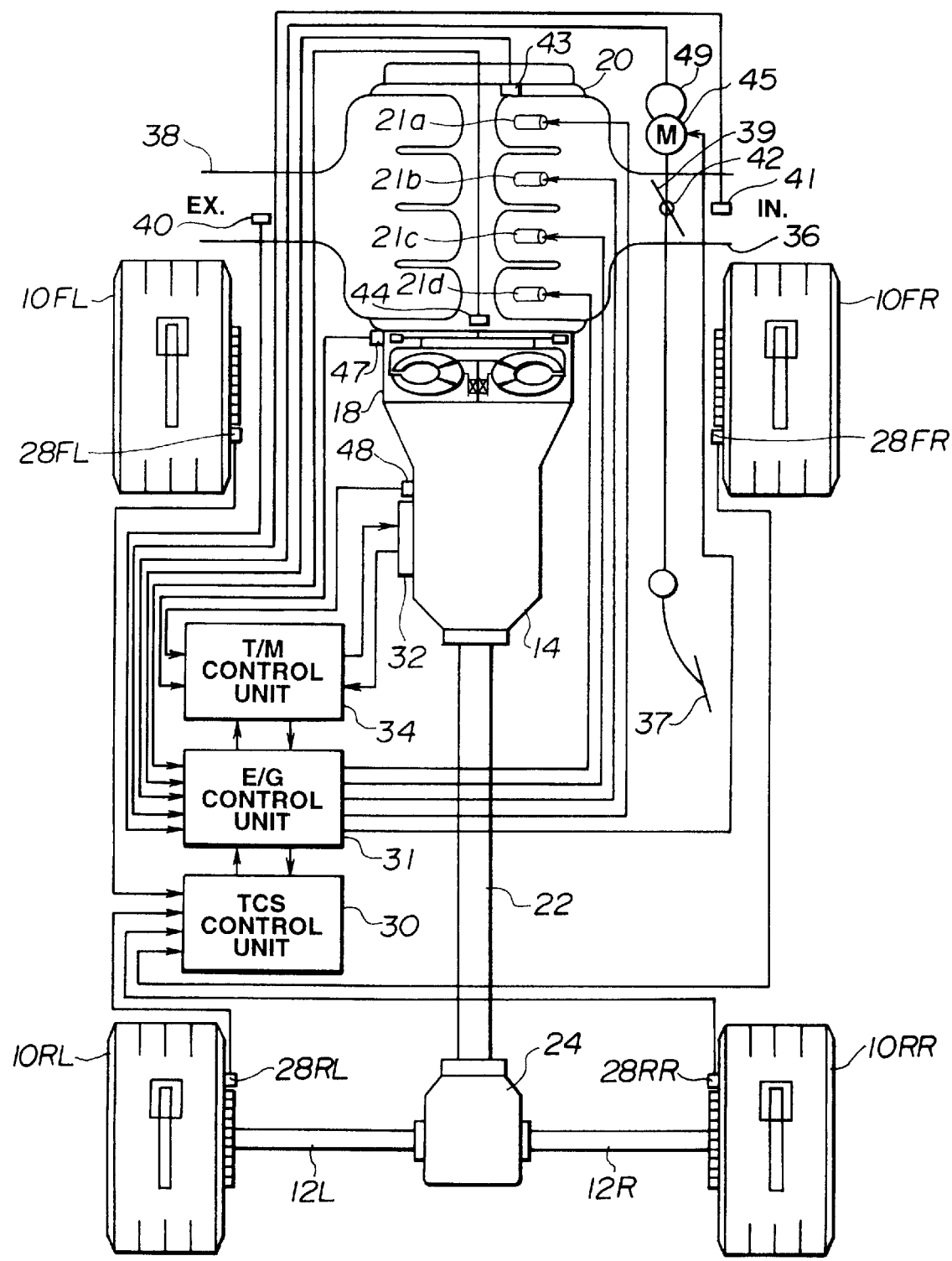
FIG. 1 is a schematic system diagram illustrating one example of an automotive vehicle employing a traction control system made according to the invention.

Referring now to the drawings, particularly to FIG. 1, the traction control system of the invention is exemplified in case of a rear-wheel-drive vehicle with an in-line four-cylinder engine and an automatic transmission. In FIG. 1, reference signs 10FL and 10FR denote front-left and front-right road wheels (driven wheels), whereas reference signs 10RL and 10RR denote rear-left and rear-right road wheels (drive wheels). The power produced by the engine 20 is transmitted through a torque converter 18 to an automatic transmission 14. The relative speeds between input and output shafts of the transmission and the torque delivered to the transmission output shaft are adjusted according to a gear ratio which is automatically selected by way of the automatic transmission 14 in response to a running condition of the vehicle. The torque is further delivered through the propeller shaft 22 and the differential gear 24 via the rear-left and rear-right axle drive shafts 12L and 12R to the two rear drive wheels 10RL and 10RR. Provided in the air-intake pipe 36 of the engine 20 are a throttle valve 39 whose opening is adjustable in response to the magnitude of depression of an accelerator pedal 37 and four fuel injectors 21a, 21b, 21c and 21d which inject or spray fuel to the respective engine cylinders. As discussed later, the fuel injectors 21a to 21d are electronically connected to an engine control unit 31 for adjustment of fuel-injection timings and fuel-injection amounts to the respective engine cylinders in response to drive signals from the engine control unit 31. Depending on the running condition of the vehicle, the engine control unit 31 can output a particular drive signal according to which the fuel-supply to one or more cylinders can be stopped or cut temporarily. Actually, the throttle opening of the throttle valve 39 is adjusted by way of the following several means. Usually, the throttle opening can be adjusted by the accelerator pedal 37, mechanically linked to the throttle valve 39, so that the throttle opening increases essentially in response to the magnitude of depression of the accelerator pedal. Alternatively, the throttle opening may be adjusted by way of an electronically-controlled actuator such as a rotary solenoid so that the magnitude of depression of the throttle valve is firstly detected by an accelerator sensor (not shown) and the engine control unit 31 secondly outputs a command signal based on the magnitude of depression to the actuator. In another, the engine control unit 31 often uses a stepper motor 45 for the throttle-opening adjustment. The engine control unit 31 and the stepper motor 45 cooperate each other to serve as a so-called automatic vehicle-speed adjustment mechanism. In this case, the stepper motor 45 is responsive to a drive signal from the engine control unit 31 to change its angular steps and consequently to adjust the throttle opening according to the angular steps. Concretely, the previously-noted automatic vehicle-speed adjustment mechanism also includes a throttle sensor 42 for detecting the opening of the throttle valve 39 and a throttle motor sensor 49 for detecting the angular steps of the stepper motor 45. On the basis of these signals from the two sensors 42 and 49, the angular steps of the stepper motor 45 may be feed-backed in response to a drive signal from the control unit 31 so that the actual vehicle speed is adjusted toward a desired value. The previously-noted several throttle-opening adjustments are often combined with each other to provide an optimal control of the throttle opening depending on the running condition of the vehicle. The throttle-opening control as previously discussed is well known. Also provided at the engine 20 and surrounding thereof are a plurality of sensors which output various signals necessary to electronically control the combusting condition of the engine by means of the engine control unit 31. As seen in FIG. 1, the engine control unit 31 is connected to various sensors, namely an air-flow meter 41 provided in the air-intake pipe 36 for detecting the flow of air introduced into the intake pipe 36, an $O_2$ sensor 40 provided in the exhaust pipe 38 for detecting oxygen concentration in the exhaust gases flowing through the exhaust pipe, a knock sensor 47 installed the outer periphery of the engine cylinder block for detecting the presence or absence of knocking, an engine speed sensor 44 provided around the engine crankshaft for detecting the revolution speed $N_E$ of the engine, and a coolant-temperature sensor (simply called water-temperature sensor) 43 provided in the coolant passageway for detecting the temperature $T_W$ of engine coolant circulating through the engine. The engine control unit 31 receives signals from the respective sensors 41, 40. 47, 44, and 43. The automatic transmission 14 employing an actuator unit 32 which is driven in response to a control signal (or a drive signal) from the transmission control unit 34. The gear ratio at which the transmission input and output shafts turn is properly adjusted or controlled by reference to two variables such as the vehicle speed detected by the vehicle-speed sensor 48 and the throttle opening detected by the throttle sensor 42, or by reference to the engine revolution speed detected by the engine speed sensor 44, to provide an optimal reduction ratio suitable for the running condition of the vehicle and consequently to assure a good traction at the drive wheels. For the purpose of optimization control (optimal control of both the engine 20 and the transmission 14 during normal driving of the vehicle), the transmission control unit 34 and the engine control unit 31 are interconnected each other to allow mutual information interchange therebetween. Four wheel-speed sensors 28FL, 28FR, 28RL and 28RR are also provided at the respective road wheels 10FL to 10RR. Each of the wheel-speed sensors is designed to generate a pulse signal of the number of pulses, proportional to the rotational speed of the associated road wheel and regarded as a wheel speed $V_{wi}$ (i=FL, FR, RL, RR) of the associated road wheel. The traction control unit 30 receives front-left, front-right, rear-left and rear-right wheel-speed indicative signals $V_{WFL}$, $V_{WFR}$, $V_{WRL}$ and $V_{WRR}$ from the wheel-speed sensors 28FL to 28RR in the form of pulse signals. Although it to not shown, the engine control unit 31 accommodates therein a microcomputer for controlling or adjusting the fuel-injection timing (or ON/OFF timings of each fuel injector), the fuel-injection amount (or a time interval of fuel-injection) and the throttle opening of the throttle valve 39, on the basis of several parameters, namely the coolant temperature $T_W$ from the water temperature sensor 43, the engine speed $N_E$ from the engine speed sensor 44, the throttle opening from the throttle sensor 42, the angular steps from the throttle motor sensor 49, the oxygen concentration from the $O_2$ sensor 40, the engine-knocking indicative signal from the knock sensor 47, and the air flow rate from the air-flow meter 41, in accordance with a specified arithmetic processing (not shown). The engine control unit 31 is also responsive to the command signal or input information from the transmission control unit 34 and the traction control unit 30 which will be more fully described later, for adjusting the fuel-injection timing, the fuel-injection amount and the throttle opening. The adjustment of the injection timing, the injection amount and the throttle opening optimize the air-fuel ratio, thereby ensuring a smooth acceleration feeling when accelerating or sufficient deceleration feeling when decelerating, and also optimizing the ignition timing of the spark plug and the idle speed during engine idle depending on the operating conditions of the engine. The engine control unit 31 operates to temporarily stop or cut the fuel-injecting action from one or more required injectors in response to a fuel-cut indicative signal which is generated from the traction control unit 30 to execute the fuel-cut control action for the required engine cylinders. In a conventional manner, the engine control unit 31 utilizes the coolant-temperature ($T_W$) versus engine-stall prevention minimum engine revolution speed ($N_{ELMT}$) characteristic shown in FIG. 2. That is, the engine control unit 31 decides to forcibly restart the fuel-injecting action, retrieving the look-up table shown in FIG. 2, for instance, when the engine speed $N_E$ from the engine speed sensor 44 becomes less then the engine-stall prevention minimum engine speed $N_{ELMT}$. As previously explained, the lower the coolant temperature, the lower the viscosity coefficient of lubricant (engine oil), and thus the friction loss (then engine-power loss) increases. In order to maintain the rotation of the engine 20 and to prevent engine stall during idling, the minimum engine revolution speed $N_{ELMT}$ is set at a predetermined lower threshold $N_{ELMT}$ within a high-temperature region above a predetermined high temperature value +Two greater than 0° C. The minimum engine revolution speed $NN_{ELMT}$ is set at a predetermined upper threshold $NN_{ELMT}$ within a low-temperature region below a predetermined low, temperature value −Two less than 0° C. Within the intermediate temperature region between the two temperature values −Two and +Two, the minimum engine revolution speed $NN_{ELMT}$ is linearly reduced in proportion to the increase in the coolant temperature Two. Referring now to FIG. 3, the traction control unit 30 accommodates therein a microcomputer 84. The microcomputer 84 includes an input interface circuit (or an input interface) 84a serving as an analog-to-digital converter, a processor 84b constructed by a microprocessor (MPU), a memory 84c constructed by a read only memory (ROM), a random access memory (RAM) and the like, and an output interface circuit (or an output interface) 84d serving as a digital-to-analog converter. The processor 84b receives four wheel-speed indicative signals from the sensors 28FL to 28RR and a signal from the engine control unit 31 to calculate a target number $N^*_{CUT}$ of engine cylinders which should be subjected to the fuel-cut control action. The memory 84c stores a specified arithmetic processing program necessary for the arithmetic processing executed by the processor 84b and successively stores results which are computed by the processor 84b.

Figure 3:
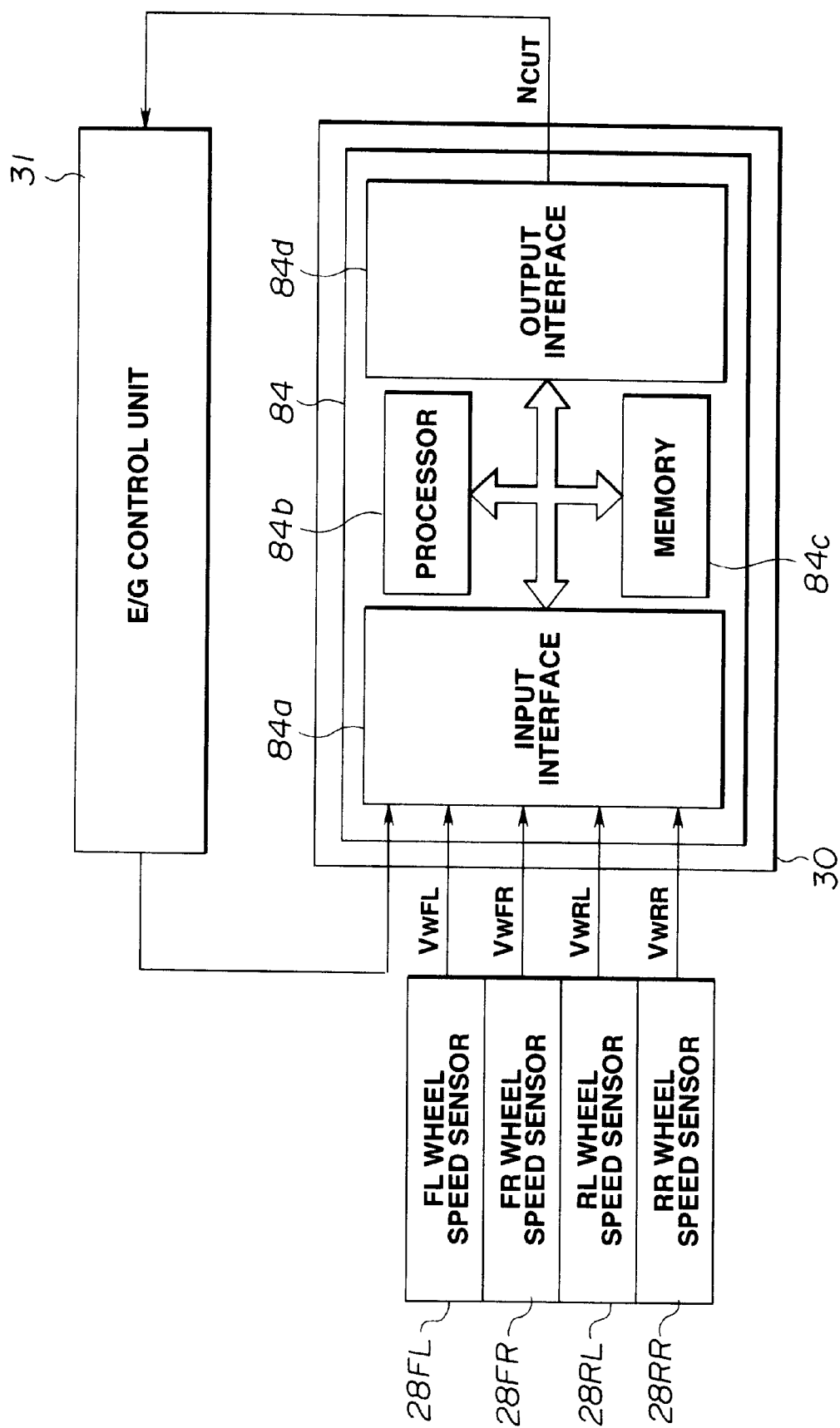
FIG. 3 is a block diagram illustrating one embodiment of the traction control unit (TCS control unit) shown in FIG. 1.
Figure 4:
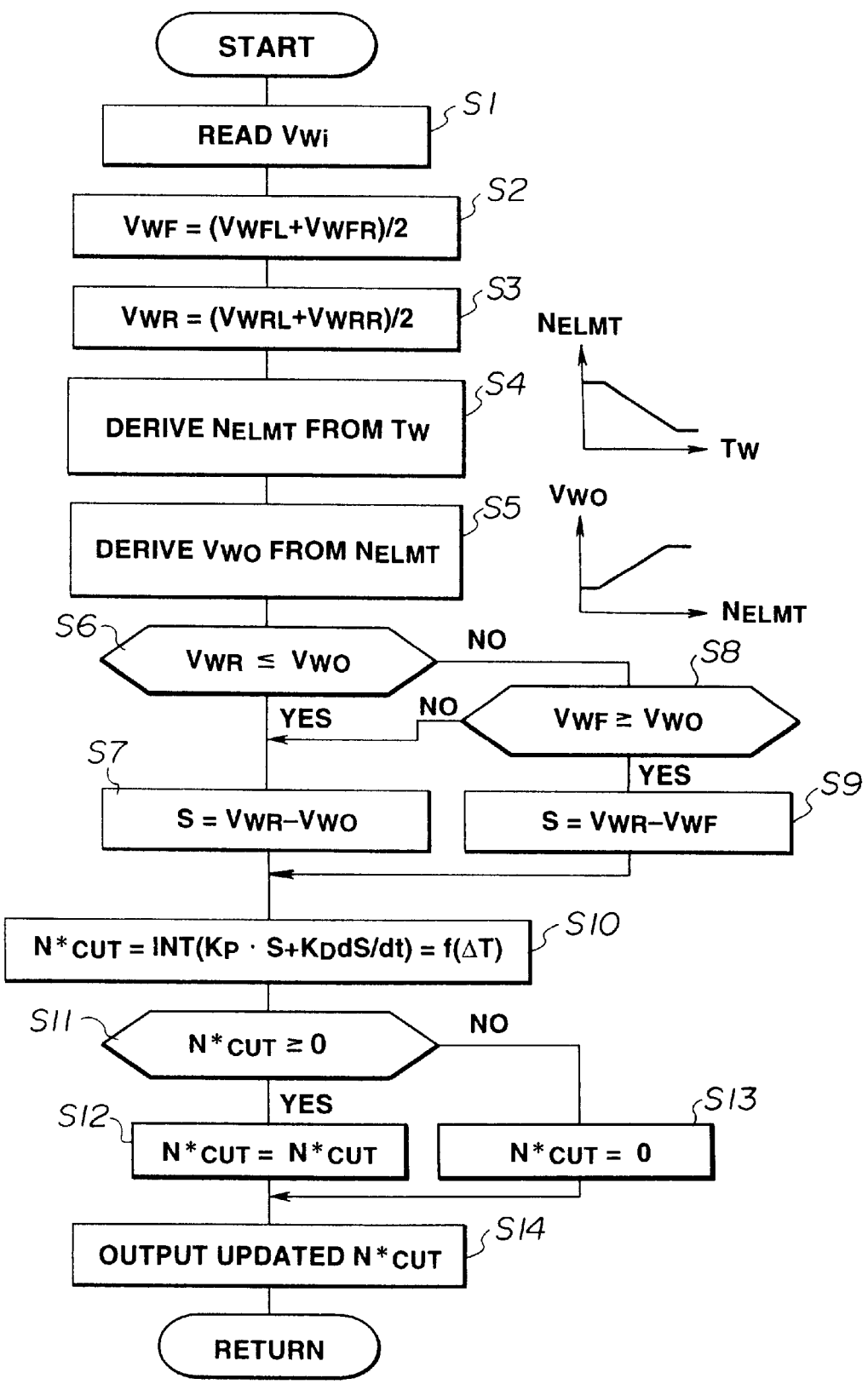
FIG. 4 is a flow chart illustrating one arithmetic processing for the traction control which is executed by the traction control unit shown in FIG. 3.

The arithmetic processing executed by the microcomputer 84 of the traction control unit 30 is hereinafter described in detail in accordance with the flow chart shown in FIG. 4. As clearly seen in FIG. 3, the processor 84b and the memory 84c are intercommunicated with each other for the purpose of successively storing information (results) from the processor 84b in the memory 84c and for extracting information stored in the memory 84c to a buffer of the processor 84b each time the processor requires. The arithmetic processing (or the routine) shown in FIG. 4 is executed by the processor 84b as time-triggered interrupt routines to be triggered every predetermined sampling time intervals ΔTs such as 5 msec.

In step S1, read are the wheel-speed indicative data Vwi (i=FL, FR, RL, RR) generated from the four wheel-speed sensors 28FL to 28RR. In step S2, a simple mean value $V_{wF}$ of the front wheel speeds (the driven wheel speeds) $V_{WFL}$ and $V_{WFR}$ is calculated by the following expression.

$$V_{WF}=(V_{WFR}+V_{WFR})/2 \qquad (6)$$

The mean value VwF of the two driven wheel speeds is regarded as a value equivalent to the vehicle speed and compared with a simple mean value $V_{WR}$ of the two drive wheel speeds to calculate the amount of slippage (simply the slip amount).

In step S3, the mean value $V_{WR}$ of the two drive wheel speeds $V_{WRL}$ and $V_{WRR}$ is calculated by the following expression.

$$V_{WR}=(V_{WRL}+V_{WRR})/2 \qquad (5)$$

Figure 2:
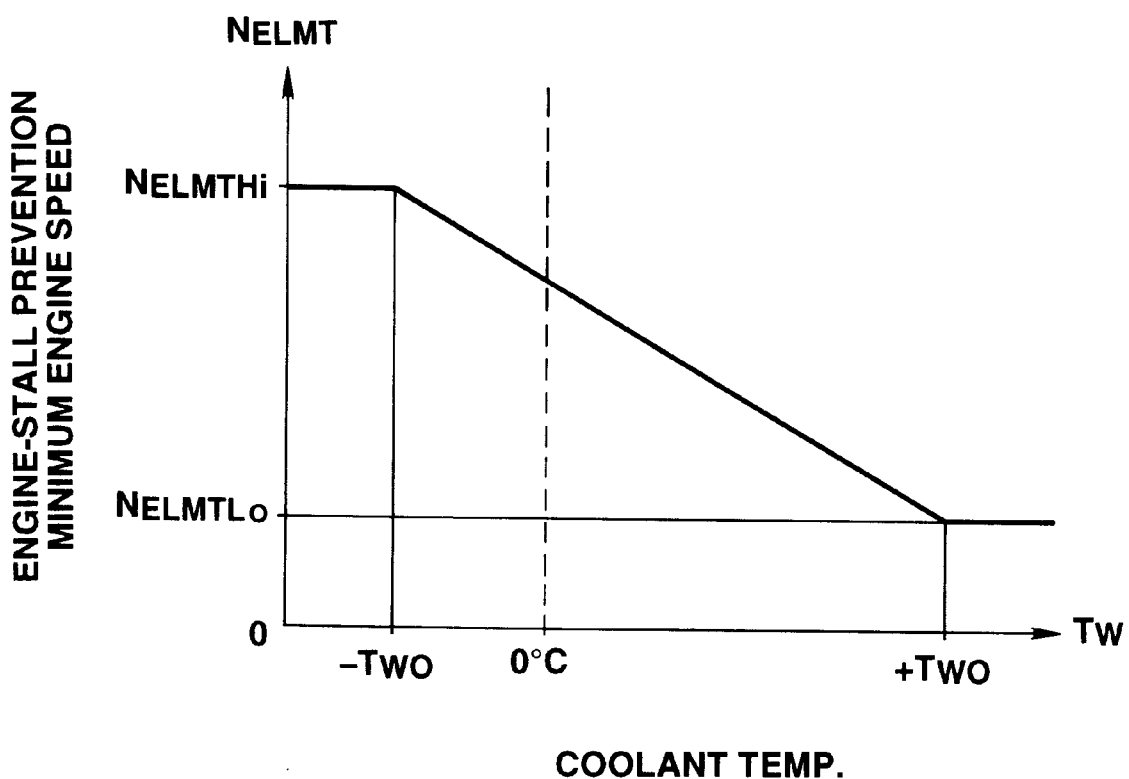
FIG. 2 is a control map (or a look-up table) showing a relationship between an engine-coolant temperature ($T_W$) and an engine-stall prevention minimum engine revolution speed ($N_{ELMT}$) which is set by the engine control unit employed in the vehicle shown in FIG. 1.

In step S4, read is the engine-stall prevention minimum engine revolution speed $N_{ELMT}$ based on the coolant temperature $T_W$ by reference to the look-up table shown in FIG. 2.

Figure 5:
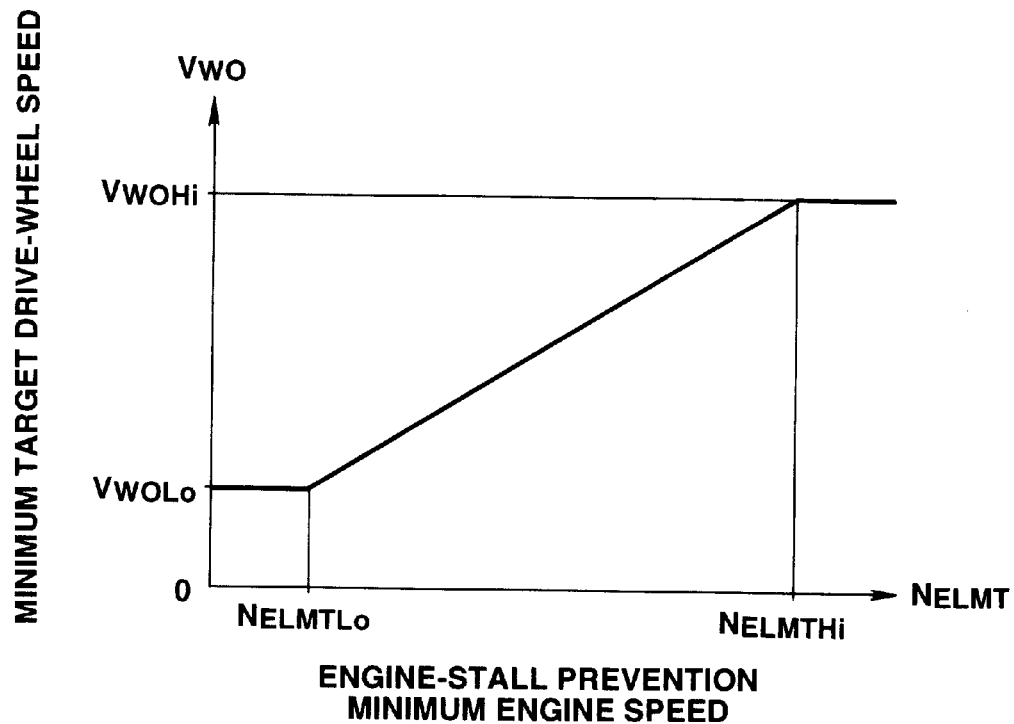
FIG. 5 is a control map (or a look-up table) showing one example of the minimum target drive-wheel speed ($V_{WO}$) which is derived depending upon the engine-stall prevention minimum engine revolution speed ($N_{ELMT}$) through the arithmetic processing shown in FIG. 4.
Figure 6:
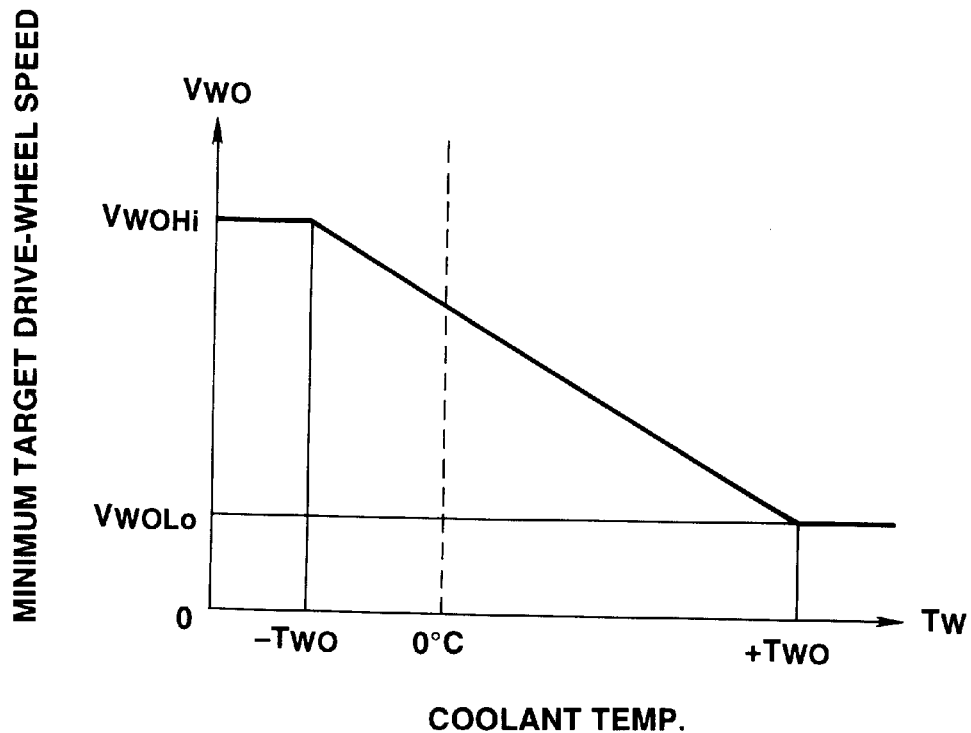
FIG. 6 is an explanatory view illustrating the correlation of the coolant temperature ($T_W$) with the minimum target drive-wheel speed ($V_{WO}$).

In step S5, a minimum target drive-wheel speed $V_{WO}$ is derived from the minimum engine revolution speed $N_{ELMT}$ derived through step S4, retrieving the look-up table shown in FIG. 5. As appreciated from the minimum engine revolution speed ($N_{ELMT}$) versus minimum target drive-wheel speed ($V_{WO}$) characteristic shown in FIG. 5, the minimum target drive-wheel speed $V_{WO}$ is held at a predetermined upper limit $V_{WOHi}$ within a first range above the predetermined maximum value $N_{ELMT}$, of the minimum engine revolution speed $N_{ELMT}$, and held at a predetermined lower limit $V_{WOLo}$ within a second range below the predetermined lower threshold $N_{ELMTLo}$ of the minimum engine revolution speed $N_{ELMT}$ and increases in proportion to the increase in the minimum engine revolution speed $N_{ELMT}$ within the intermediate range defined between the first and second ranges. As can be appreciated, the coolant temperature ($T_w$) versus minimum target drive-wheel speed ($V_{WO}$) characteristic shown in FIG. 6 is obtained by combining the characteristic shown in FIG. 2 with the characteristic shown in FIG. 5. That is, the minimum target drive-wheel speed $V_{WO}$ is set at the predetermined lower limit $V_{WOLo}$ within a high-temperature region above the predetermined high temperature value +Two, and set at the predetermined upper limit $V_{WOHi}$ within a low-temperature region below the predetermined low temperature value −Two. Within the intermediate temperature region between the two temperature values −Two and +Two, the minimum target drive-wheel speed $V_{WO}$ is linearly decreased in proportion to the increase in the coolant temperature Two. The characteristics shown in FIGS. 5 and 6 are exemplified in case of only the starting period of the vehicle, (i.e., only when the first-speed gear is selected by the automatic transmission 14. Additionally, the lower limit $V_{WOLo}$ of the minimum target drive-wheel speed $V_{WO}$ is set at a value that maintains the rotation of the engine without engine stall even when the mean drive-wheel speed (or the mean rear wheel speed) $V_{WR}$ reaches the lower limit $V_{WOLo}$ within the low-temperature region below the predetermined low temperature value −Two, whereas the upper limit $V_{WOHi}$ of the minimum target drive-wheel speed $V_{WO}$ is set at a value that maintains the rotation of the engine without engine stall even when the mean drive-wheel speed $V_{WR}$ reaches the upper limit $V_{WOHi}$ within the high-temperature region above the predetermined high temperature value +Two. Therefore, there is no risk of stalling the engine even if the mean drive-wheel speed $V_{WR}$ becomes equal to the minimum target drive-wheel speed $V_{WO}$, which is retrieved on the basis of the coolant temperature $T_W$, all over the coolant-temperature range.

In step S6, a test is made to determine whether the mean drive-wheel speed $V_{WR}$ (calculated at step S3) is less than or equal to the minimum target drive-wheel speed $V_{WO}$. When the answer to step S6 is affirmative (YES), i.e., in case of $V_{WR} \leq V_{WO}$, step S7 proceeds. When the answer to step S6 is negative (NO), i.e., in case of $V_{WR} > V_{WO}$, step S8 proceeds. Similarly, in step S8, a test is made to determine whether the mean driven-wheel speed $V_{WF}$ (calculated at step S2) is greater than or equal to the minimum target drive-wheel speed $V_{WO}$. In case of $V_{WF} \geq V_{WO}$, step S9 proceeds. In contrast, in case of $V_{WF} < V_{WO}$, step S7 proceeds. That is to say, the above-mentioned two steps S6 and S8 are provided to determine whether the vehicle is in the steady running state at a vehicle speed above a predetermined value essentially equivalent to the minimum target drive-wheel speed $V_{WO}$ or the vehicle accelerates at a low speed below the predetermined value for example during starting. In step S7, a slip velocity (regarded as a slip amount S) of the rear drive wheels 10RL and 10RR is calculated as the deviation between the mean drive-wheel speed $V_{WR}$ and the minimum target drive-wheel speed $V_{WO}$ in accordance with the following expression.

$$S = V_{WR} - V_{WO} \tag{7}$$

Similarly in step S9, a slip velocity (a slip amount S) of the rear drive wheels 10RL and 10RR is calculated as the deviation between the mean drive-wheel speed $V_{WF}$ and the mean driven-wheel speed $V_{WF}$ in accordance with the following expression.

$$S = V_{WR} - V_{WF} \tag{8}$$

Subsequently to steps S7 or S9, step S10 enters in which the target number $N^*_{CUT}$ of engine cylinders which are subjected to the fuel-cut operation is calculated on the basis of the slip amount S (calculated through steps S7 or S9) and its differentiated value in accordance with the following expression.

$$N^*_{CUT} = \text{INT}(K_P + K_D \cdot (dS/dt)) \tag{9}$$

where $K_p$ denotes a proportional gain and $K_D$ denotes a differential gain, and INT means omitting or discarding of the figures (the digits) below the decimal point in the calculated value ($K_p \cdot S + K_D \cdot (dS/dt)$). The expression (9) is very important to properly reduce a driving force delivered to the rear drive wheels 10RL and 10RR by setting the target number $N^*_{CUT}$ of fuel-cut engine cylinders through the proportional plus derivative control action based on the slip amount S and its differentiated value dS/dt. The target number $N^*_{CUT}$ calculated by the expression (9) can be regarded as being equivalent to a decrement $\Delta T$ of the driving torque delivered to the drive wheels 10RL and 10RR. In other words, the expression $\{N^*_{CUT} = \text{INT}(K_p S + K_D \cdot (dS/dt))\}$ is a function $f(\Delta T)$ of the decrement $\Delta T$ of the driving torque delivered to the drive wheels.

In step S11, a test is made to determine whether the calculated target number $N^*_{CUT}$ of fuel-cut cylinders is greater than or equal to zero. In case that the calculated target number $N^*_{CUT}$ is zero or a positive integer, i.e., in case of $N^*_{CUT} \geq 0$, step 512 enters. Conversely in case of $N^*_{CUT} < 0$, step S13 enters. In step S12, the previous value of the target number $N^*_{CUT}$ of fuel-out cylinders is updated by the current target number $N^*_{CUT}$ calculated at step S10, and thereafter step S14 proceeds. In contrast to the above, step S13 decides that the calculated target number less than zero is an improper value, and then resets the previous value of the target number $N^*_{CUT}$ of fuel-cut cylinders to zero. Thereafter step S14 follows step S13. In step S14, a control command representative of the updated target number $N^*_{CUT}$ of fuel-cut cylinders is output from the output interface circuit of the traction control unit 30 to the engine control unit 31, so as to execute the fuel-cut operation for one or more cylinders in response to the updated target number $N^*_{CUT}$. After this, the control procedure returns from the sub-routine shown in FIG. 4 to the main program. As set out above, steps S6 to S9 are provided to determine whether the vehicle is in the steady running state at the vehicle speed above the predetermined value (the minimum target drive-wheel speed $V_{WO}$), the vehicle begins to run at the vehicle speed below the predetermined value $V_{WO}$, or the vehicle accelerates again after adequate deceleration and to calculate the slip amount S depending upon the respective running states of the vehicle. As can be appreciated from the flow from steps S6 or S8 to step S7, in case that the mean rear-wheel speed (corresponding to the mean drive-wheel speed) $V_{WR}$ is less than or equal to the minimum target drive-wheel speed $V_{WO}$ or in case that the mean front-wheel speed $V_{WF}$ (equivalent to the vehicle speed) is less than the minimum target drive-wheel speed $V_{WO}$, (i.e., in case of $V_{WR} \leq V_{WO}$ or $V_{WF} < V_{WO}$), the procedure of FIG. 4 flows to step S7 so as to calculate the slip amount S as the deviation between the mean rear-wheel speed $V_{WR}$ and the minimum target drive-wheel speed $V_{WO}$ computed in consideration of the current value of the engine-stall prevention minimum engine speed $N_{ELMT}$ by reference to the look-up table of FIG. 5. As appreciated from the flow from step S6 via step S8 to step S9, in case that the mean rear-wheel speed (corresponding to the mean drive-wheel speed) $V_{WR}$ is greater than the minimum target drive-wheel speed $V_{WO}$ and the mean front-wheel speed $V_{WF}$ (equivalent to the vehicle speed) is greater than or equal to the minimum target drive-wheel speed $V_{WO}$, (i.e., in case of $V_{WR} > V_{WO}$ and $V_{WF} \geq V_{WO}$), the traction control unit decides that the vehicle is in the steady running state at a speed higher than the minimum target drive-wheel speed $V_{WO}$ (computed at step S5) enough to maintain the engine-stall prevention minimum engine revolution speed $N_{EMT}$, and thus the procedure of FIG. 4 flows to step S9 so as to calculate the slip amount S as the deviation between the mean rear-wheel speed $V_{WR}$ (corresponding to the mean drive-wheel speed) and the mean front-wheel speed $V_{WF}$ (equivalent to the vehicle speed). In other words, the traction control unit regards the minimum target drive-wheel speed $V_{WO}$ as a desired value of the mean rear-wheel speed $V_{WR}$ (corresponding to the mean drive-wheel speed) when the vehicle speed is below the minimum target drive-wheel speed $V_{WO}$. Conversely, when the vehicle speed is above the minimum target drive-wheel speed $V_{WO}$, for the purpose of reducing the slip amount S of the rear road wheels (the drive wheels) 10RL and 10RR as much as possible, the traction control unit sets the mean front-wheel speed $V_{WF}$ as a desired value of the mean rear-wheel speed $V_{WR}$ (corresponding to the mean drive-wheel speed). In case of setting of the slip amount S through the arithmetic processing of FIG. 4, the desired value of the mean rear-wheel speed $V_{WR}$ (corresponding to the mean drive wheel speed) tends to vary discontinuously, but not in stepwise manner. The traction control (or the fuel-cut control) based on the sub-routine of FIG. 4 ensures a smooth starting-acceleration of the vehicle.

Figure 7A:
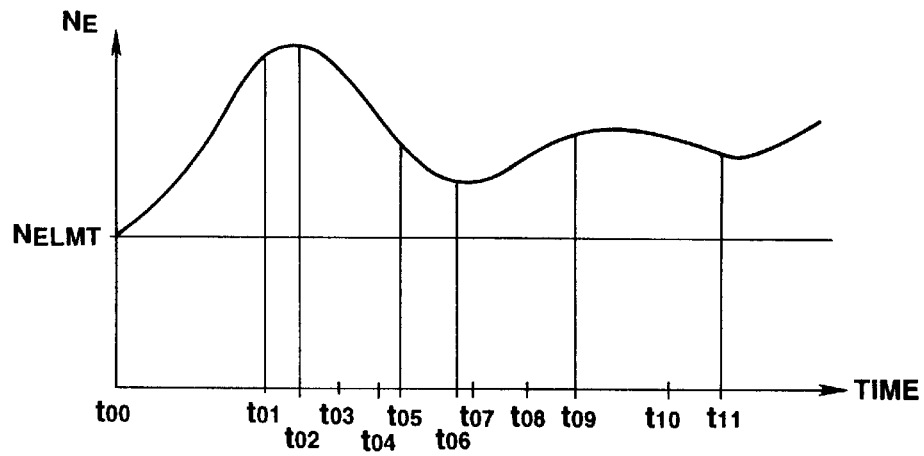
FIGS. 7A, 7B and 7C are timing charts showing the operation of the traction control based on the arithmetic processing of FIG. 4.
Figure 7B:
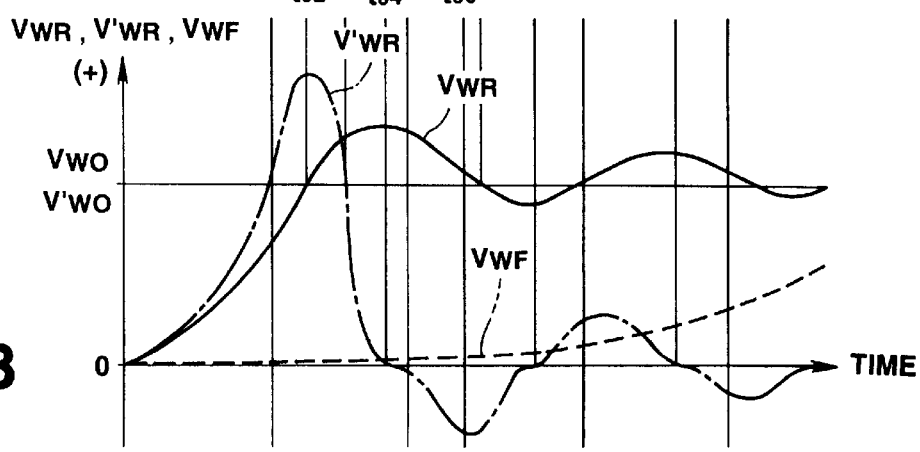
Figure 7C:
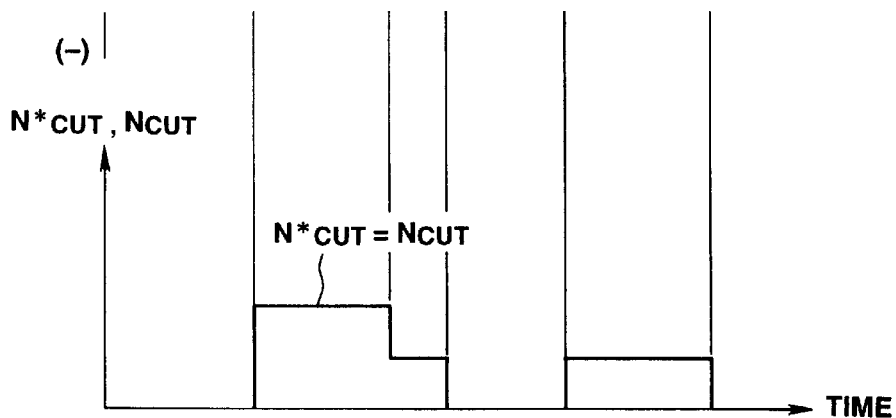

Hereinbelow described in detail according to the timing charts shown in FIGS. 7A, 7B and 7C, is the operation of the traction control unit 30 which executes the traction control action according to the sub-routine shown in FIG. 4. The driving-force (traction) delivered to the rear road wheels (the drive wheels) 10RL and 10RR is properly controlled so that the mean rear-wheel speed $V_{WR}$ (i.e., the mean drive-wheel speed) is adjusted toward the desired value namely the mean front-wheel speed $V_{WF}$ (equivalent to the vehicle speed) during the steady running of the vehicle at speeds greater than a certain vehicle speed such as the previously-noted minimum target drive-wheel speed $V_{WO}$, and hereupon omitted is the detailed explanation for the control action performed when running in the steady state at the intermediate speeds or more. The simulation results shown in FIGS. 7A to 7C are executed on the assumption that the vehicle quickly starts on a road surface of a low friction coefficient (A so-called low-$\mu$ road) at the time $t_{00}$ under a particular condition wherein the vehicle is in the stopped state and the engine is cold. FIG. 7A shows variations in the engine speed NE at any time t. FIG. 7B shows variation s in the mean rear-wheel speed $V_{WR}$, variations in a mean rear-wheel acceleration $V'_{WR}$ (corresponding to a differentiated value $V'_{WR}$ of the mean rear-wheel speed), and variations in the front-wheel speed $V_{WF}$ at any time t. The differentiated value $V'_{WR}$ is necessary for the previously-discussed expression (9). FIG. 7C shows variations in the calculated target number $N^*_{CUT}$ of fuel-out cylinders, being obtained through the arithmetic processing of FIG. 4, and variations in the actual number $N_{CUT}$ of fuel-cut cylinders which have been actually subjected to the fuel-cut control action by way of the engine control unit 31, at any time t. For the purpose of easy understanding, the simulation is also performed on the assumption that the coolant temperature $T_W$ is fixed at a specified low temperature, and the engine-stall prevention minimum engine revolution speed $N_{ELMT}$ (retrieved by the engine control unit 31 by reference to the look-up table of FIG. 2, see step S4) is also fixed at a certain constant value enough to maintain the idle speed at the specified low coolant temperature, and thus the minimum target drive-wheel speed $V_{WO}$ (retrieved from the engine-stall prevention minimum engine revolution speed $N_{ELMT}$ based on the coolant temperature $T_W$ by reference to the look-up table of FIG. 5, see step S5) is held at a fixed value that undesired engine stall does not take place even if the mean rear-wheel speed $V_{WR}$ reaches the above-mentioned minimum target drive-wheel speed $V_{WO}$. Also, since the target number $N^*_{CUT}$ of fuel-cut engine cylinders is expressed as a simple sum of the proportional value (Kp·S) and the differentiated value ($K_D$·(dS/dt)) with respect to the calculated slip amount S through the expression (9), a minimum target drive-wheel acceleration $V'_{WO}$, which is obtained by differentiating the minimum target drive-wheel speed $V_{WO}$ with respect to the time t and set as a desired value of the mean rear-wheel acceleration $V'_{WR}$, and the minimum target drive-wheel speed $V_{WO}$ are indicated on the same horizontal line in the timing chart shown in FIG. 7B by way of proper scaling process in the microcomputer. That is, let us suppose that the two values $V_{WO}$ and $V'_{WO}$ are fixed at constant values for a while (for at least the time interval between $t_{00}$ and $t_{11}$).

Until the time $t_{00}$, the engine speed $N_E$ is maintained at the engine-stall prevention minimum engine revolution speed $N_{ELMT}$. When the vehicle is quickly started with the accelerator pedal greatly depressed by the driver at the time $t_{00}$, the engine speed $N_E$ begins to gradually increase with a slight phase lag. The mean rear-wheel acceleration $V'_{WR}$ also increases greatly within its positive region according to the increase in the engine power, whereas the mean rear-wheel speed $V_{WR}$ increases gradually with a phase lag with respect to the mean rear-wheel acceleration $V'_{WR}$. At the beginning of starting (see the period of time between $t_{00}$ and $t_{01}$), since the vehicle does not move irrespective of the increase in the mean rear-wheel speed ($V_{WR}$) and acceleration ($V'_{WR}$) and however the rear road wheels (the drive wheels) begin to slip or spin on the low-$\mu$ road, the mean front-wheel speed $V_{WF}$ does not almost increase. For the time period of $t_{00}$ and $t_{01}$, the mean rear-wheel speed $V_{WR}$ as well as the mean front-wheel speed $V_{WF}$ do not yet reach the above-mentioned minimum target drive-wheel speed $V_{WO}$. Under such a condition, when the sub-routine shown in FIG. 4 is time-triggered, the procedure flows from step S6 to step S7 in which a negative slip amount S is obtained by subtracting the minimum target drive-wheel speed $V_{WO}$ from the mean rear-wheel speed $V_{WR}$ through the expression (7). Thereafter, step S10 enters in which the target number $N^*_{CUT}$ of fuel-cut cylinders is calculated on the basis of both the slip amount S calculated at step S7 and its differentiated value (dS/dt) through the expression (9). In this case, since the calculated slip mount s and the differentiated value (dS/dt) are both negative values, the target number $N^*_{CUT}$ itself becomes negative, and as a result the procedure flows from step S10 via step S11 to step S13. Thus, the current value of the target number $N^*_{CUT}$ of fuel-cut cylinders is set at "0" and simultaneously the previous value of the target number is updated by the current value (zero). As a consequence, the engine control unit 31 does not execute the fuel-cut control action with respect to all of the engine cylinders in response to the updated target number (zero) of fuel-out cylinders. Thereafter, at the time $t_{01}$, suppose that on the one hand the mean rear-wheel speed $V_{WR}$ is still less than the minimum target drive-wheel speed $V_{WO}$ and on the other hand the minimum target drive-wheel acceleration $V'_{WR}$, increasing within the positive region, becomes greater than the minimum target drive-wheel acceleration $V'_{WO}$ and continues to increase greatly, and additionally the mean front-wheel speed $V_{WF}$ (equivalent to the vehicle speed) is still less than the minimum target drive-wheel speed $V_{WO}$, at this time, in a newly time-triggered interrupt routine shown in FIG. 4, the procedure flows from step S6 to Step S7. Similarly to the sub-routine executed previously, a negative slip amount S is calculated owing to the mean rear-wheel speed $V_{WR}$ less than the minimum target drive-wheel speed $V_{WO}$. However, the differentiated value (dS/dt) based on the minimum target drive-wheel acceleration $V'_{WR}$ varies from the negative value to the positive value owing to the magnitude relationship indicated by the inequality $V'_{WR} > V'_{WO}$. Therefore, just before the time $t_{01}$, the target number $N^*_{CUT}$ of fuel-cut cylinders may be set at a positive integer for example "+2" (corresponding to half the cylinders of the four-cylinder engine) through the expression (9) in step S10. In case of such a positive target number ($N^*_{CUT}=2$), the procedure flows from step S10 via step S11 to step S12 in which the previous value of the target number $N^*_{CUT}$ of fuel-cut cylinders is updated by the current value "2", and thus the traction control unit 30 outputs a command signal representative of the updated target number $N^*_{CUT}$ being set at "2" to the enginecontrol unit 31. As a result, the engine control unit actually performs the fuel-cut control action with respect to two cylinders of the four engine cylinders. Therefore, as seen in FIG. 7C, the actual number $N^*_{CUT}$ of fuel-cut cylinders is identical to the target number $N^*_{CUT}$ of fuel-cut cylinders for a while from the time $t_{01}$. Owing to the fuel-cut control action, the increasing rate of the engine speed $N_E$ gradually decreases for the time period from $t_{01}$ to $t_{02}$. As soon as the engine speed $N_E$ reaches a maximal value at the time $t_{02}$, the engine speed $N_E$ begins to reduce moderately, and thus the increasing rate of the mean rear-wheel acceleration $V'_{WR}$ gradually reduces and the mean rear-wheel acceleration $V'_{WR}$ reaches its maximal value near the time $t_{02}$ and begins to decrease from the time $t_{02}$ and becomes less than the minimum target drive-wheel speed $V'_{WO}$ at the time $t_{03}$. On the other hand, the mean rear-wheel speed $V_{WR}$ still continues to increase even after the time $t_{03}$ with the phase lag with respect to the mean rear-wheel acceleration $V'_{WR}$. The mean rear-wheel speed $V_{WR}$ just reaches the minimum target drive-wheel speed $V_{WO}$ at the time $t_{02}$. Therefore, for the time period from $t_{01}$ to $t_{02}$, the previously-noted fuel-cut control action is made. For the time period from $t_{02}$ to $t_{03}$, in the sub-routine newly triggered, the procedure flows from step S6 via step S8 to step S7 in which a positive slip amount S is now derived by the expression (7), because of the mean rear-wheel speed $V_{WR}$ above the minimum target drive-wheel speed $V_{WO}$. For example in the same manner as the previous sub-routine, the target number $N^*_{CUT}$ of fuel-cut cylinders maybe successively updated by "2" each time the sub-routine of FIG. 4 is executed for the time period between $t_{02}$ and $t_{03}$. Thus, the engine control unit 31 continues to execute the fuel-cut control action according to the calculated target number $N^*_{CUT}$ (for example "2") of fuel-cut cylinders. As previously explained, even when the drive-wheel speed (the mean rear-wheel speed $V_{WR}$) drops down to the minimum target drive-wheel speed $V_{WO}$, there is less possibility of engine-stall irrespective of whether the engine is cold or warm, since the traction control unit of the embodiment sets the minimum target drive-wheel speed $V_{WO}$ at a value necessary to maintain the engine-stall prevention minimum engine revolution speed $N_{ELMT}$ that the engine never stalls, in response to the coolant temperature $T_W$. Therefore, at any time t after the time $t_{03}$, the engine speed $N_E$ moderately decreasing never becomes less than the engine-stall prevention minimum engine revolution speed $N_{ELMT}$. Appreciated from the simulation results, the engine speed $N_E$ has been held at a value greater than the engine-stall prevention minimum engine revolution speed $N_{ELMT}$ throughout the simulation time duration. As a consequence, the recovery control action such as restarting of fuel-injection in the fuel-cut cylinder, is not executed, and the actual number $N_{CUT}$ of fuel-cut cylinders is fixed at the target number $N^*_{CUT}$ until the time $t_{05}$ has been reached. Owing to the previously-noted continuous fuel-cut control action, the engine speed $N_E$ continues to reduce moderately, and simultaneously the mean rear-wheel acceleration $V'_{WR}$ continues to reduce within the positive region, and thus the mean rear-wheel speed $V_{WR}$ continues to increase moderately with its increasing rate gradually reducing to zero. Shortly, the mean rear-wheel speed $V_{WR}$ reaches a maximal value at the time $t_{04}$ and thereafter begins to decrease. The mean rear-wheel acceleration $V'_{WR}$ (corresponding to the differentiated value of the mean rear-wheel speed $V_{WR}$) of course becomes zero at the time $t_{04}$, and then reduces in the negative region. Therefore, in the same manner as the time period between $t_{02}$ and $t_{03}$, the target number $N^*_{CUT}$ of fuel-cut cylinders may be held at "2" according to the flow stop S6 through steps S8, S7. S10 and S11 to step S12, for the time period from $t_{03}$ to $t_{05}$. Thus, the actual number $N_{CUT}$ of fuel-cut cylinders is also maintained at a value identical to the target number $N^*_{CUT}$, since the engine speed $N_E$ remains greater than the engine-stall prevention minimum engine revolution speed $N_{ELMT}$. After the time $t_{05}$, the slip amount S (regarded as being essentially equivalent to the mean rear-wheel speed $V_{WR}$) is a comparatively small positive value, whereas the differentiated value (dS/dt, regarded as being essentially equivalent to the mean rear-wheel acceleration $V'_{WR}$) is a negative value and its absolute value $|dS/dt|$(or $|V'_{WR}|$) is comparatively great. As a result, the target number $N^*_{CUT}$ of fuel-cut cylinders is shifted from "2" to "1", for example, through the expression (9) in step S10. At this time, the engine power is consumed in the form of wheel-spin (acceleration-slip) at the rear drive wheels 10RL and 10RR. Thus, although the mean rear-wheel speed $V_{WR}$ begins to drop towards the minimum target drive-wheel speed $V_{WO}$, its rotational inertia is not yet converged to its stable region (a proper moment of inertia) to smoothly move or drive the vehicle body. As a consequence, the mean front-wheel speed $V_{WF}$ (regarded as being equivalent to the vehicle speed) does not almost increase. On the other hand, the engine control unit in response to the target number $N^*_{CUT}$ shifted from "2" to "1", to execute the fuel-cut control action with respect to one of four cylinders, since the engine speed $N_E$ is still maintained at a level above the engine-stall prevention minimum engine revolution speed $N_{ELMT}$. Owing to reduction in the actual number of fuel-cut cylinders to the number "1", the decreasing rate of the engine speed $N_E$ is further decreased down to zero with reduction in the decreasing rate of the engine power. As a result, the decreasing rate of the mean rear-wheel acceleration $V'_{WR}$ gradually reduces within the negative region. Shortly, substantially at the time $t_{06}$, the mean rear-wheel acceleration $V'_{WR}$ reaches to a minimal value and turns to the increasing state within the negative region, and thus the differentiated value (dS/dt) of the slip amount remains at a negative value whose absolute value is comparatively great. In contrast, the mean rear-wheel speed $V_{WR}$ remains reduced owing to the phase lag with respect to the mean rear-wheel acceleration $V'_{WR}$, and thus the slip amount S becomes an excessively small positive value. In the arithmetic processing (particularly at step S10) of FIG. 4, time-triggered just after the time $t_{06}$, the calculated target number (INT(Kp·S+$K_D$·(dS/dt)) tends to become a negative value, and thus the target number $N^*_{CUT}$ is set at "0". As a result, just at the time $t_{06}$, the traction control unit 30 outputs a control command representative of $N^*_{CUT}$=0 to the engine control unit 31, with the result that any fuel-cut control action is not executed. Thereafter, the engine speed $N_E$ begins to rise gradually. With the mean rear-wheel speed $V_{WR}$ approaching slowly to the minimum target drive-wheel speed $V_{WO}$, the rotational inertia of the rear drive wheels its converged to the stable state and drops down to a proper small moment of inertia from near the time $t_{06}$, with the result that good traction or grip can be obtained during starting-acceleration at the low-$\mu$ road. The vehicle begins to move moderately, thereby resulting in a moderate increase in the mean front-wheel speed $V_{WF}$. Thus, the mean rear-wheel acceleration $V'_{WR}$ begins to increase again within the negative region with a little time lag from the time $t_{06}$. The mean rear-wheel acceleration $V'_{WR}$ acts to move the vehicle, supporting the mass of he vehicle body, and thus the mean rear-wheel acceleration $V'_{WR}$ is soon converged to zero for a comparatively short time duration from $t_{06}$ to $t_{08}$ and simultaneously the engine power is effectively consumed to move the vehicle with a good traction. As a result, the engine speed $N_E$ increases moderately after the time $t_{06}$. In contrast with the mean rear-wheel acceleration $V'_{WR}$, the mean rear-wheel speed $V_{WR}$ becomes less than the minimum target drive-wheel speed $V_{WO}$ at the time $t_{07}$ (later than the time $t_{06}$) due to the phase lag, and then decrease * moderately toward a minimal value. The mean rear-wheel speed $V_{WR}$ reaches the minimal value at the time $t_{08}$ in which the mean rear-wheel acceleration $V'_{WR}$ turns to a positive value, and then begins to increase. Under this condition, the drive wheels certainly drives the vehicle, keeping a proper traction, and therefore the mean front-wheel speed $V_{WF}$ (equivalent to the vehicle speed) continues to increase with a relatively great increasing rate, although both the increasing rate of the mean rear-wheel acceleration $V'_{WR}$ and the increasing rate of the mean rear-wheel speed $V_{WR}$ are small after the time $t_{08}$. For the time period from $t_{07}$ to $t_{08}$, the calculated target number $N^*_{CUT}$ (=INT(Kp·S+$K_D$·(dS/dt)) is maintained at a negative value, and thus the target number $N^*_{CUT}$ is set at zero through the flow from step S11 to step S13. The engine control unit 31 never executes any fuel-cut control action but continues to supply fuel in to each engine cylinder in response to the throttle opening, and as a result the engine speed $N_E$ increases moderately while the engine power is consumed effectively to move the vehicle. After this, at the time $t_9$, the mean rear-wheel speed $V_{WR}$ exceeds the minimum target drive-wheel speed $V_{WO}$, while the mean rear-wheel acceleration $V'_{WR}$ remains less than the minimum target drive-wheel acceleration $V'_{WO}$. In the sub-routine triggered Just after the time $t_{09}$, the procedure flows from step S6 through steps S8, S7, S10 and S11 to step S12, owing to the conditions represented by the inequalities $V_{WR}$, $V_{WR}$>0 and $V_{WR}$>$V_{WO}$. Thus, the target number $N^*_{CUT}$ of fuel-cut cylinder may be set at a relatively small positive integer for example "1". As a consequence, the engine control unit 31 executes the fuel-cut control action to one of the four engine cylinders in the same manner as the ti me interval between $t_{05}$ and $t_{06}$. Owing to the fuel-cut action made to the one engine cylinder, the engine speed $N_E$ and the engine power both reduce again. As previously discussed, through steps S4 and S5, the traction control unit of the embodiment sets the minimum target drive-wheel speed $V_{WO}$ at a value necessary to maintain the engine-stall prevention minimum engine revolution speed $N_{ELMT}$ that the engine never stalls, in response to the coolant temperature $T_W$, and thus the engine speed $N_E$ never becomes less than the engine-stall prevention minimum engine revolution speed $N_{ELMT}$ at any time t. Thus, any recovery control action is not executed. On the other hand, the mean rear-wheel acceleration $V'_{WR}$ increases moderately with its increasing rate gradually reducing, and soon reaches another maximal value and then begins to reduce again. With a little phase lag, the mean rear-wheel speed $V_{WR}$ tends to reduce moderately with its increasing rate gradually dropping to zero, and then reaches another maximal value at the time $t_{10}$ a when the mean rear-wheel acceleration $V'_{WR}$ approaches again to zero. As sat out above, the mean rear-wheel speed $V_{WR}$ repeatedly increases and decreases, however the mean rear-wheel speed $V_{WR}$ is gradually converged to its steady state while crossing at the horizontal line indicating the minimum target drive-wheel speed $V_{WO}$ which may provide a good traction or grip during starting-acceleration on the low-$\mu$ road, with the result that the rotational inertia of the drive wheels 10RL and 10RR is also converged within toward the stable region and properly drops to the proper moment of inertia. Under these conditions, the driving torque suitably delivered to the rear drive wheels drives or moves the vehicle moderately but certainly. Thus, the mean front-wheel speed $V_{WF}$ increases at an increasing tempo. Thereafter, the slip a amount S, which is obtained as the deviation between the mean rear-wheel speed $V_{WR}$ and the minimum target drive-wheel speed $V_{WO}$, becomes a relatively small positive value due to the decrease in the variable $V_{WR}$, while the differentiated value (dS/dt) becomes a negative value whose absolute value is relatively great due to the variable $V'_{WR}$ dropping again to another minimal value. Thus, when the sub-routine is time-triggered just after the time $t_{11}$, the target number $N^*_{CUT}$ of fuel-cut cylinders is reset to "0" according to the flow from step S10 via step S11 to step S13, and then the engine control unit operates to deliver fuel to injectors of all engine cylinders from the time $t_{11}$. This causes an increase in the engine speed $N_E$. At this time, the slip amount S (i.e., ($V_{WR}$-$V_{WF}$)) of the rear wheels relative to the front wheels is reduced to a considerably small value. In other words, the drive wheels get a proper grip or traction on the low-$\mu$ road, and thus the engine power is effectively consumed to smoothly drive the vehicle. As a result, after the time $t_{11}$, the increasing rates of both the mean rear-wheel acceleration $V'_{WR}$ and the mean rear-wheel speed $V_{WR}$ are small. Owing to the recovery of traction at the drive wheels, the drive wheels smoothly moves the vehicle such that the vehicle speed approaches to the mean rear-wheel speed. Thus, the mean front-wheel speed $V_{WF}$ (equivalent to the vehicle speed) continues to increase at an increasing tempo. Thereafter, the vehicle can get a stable starting-acceleration.

Figure 8A:
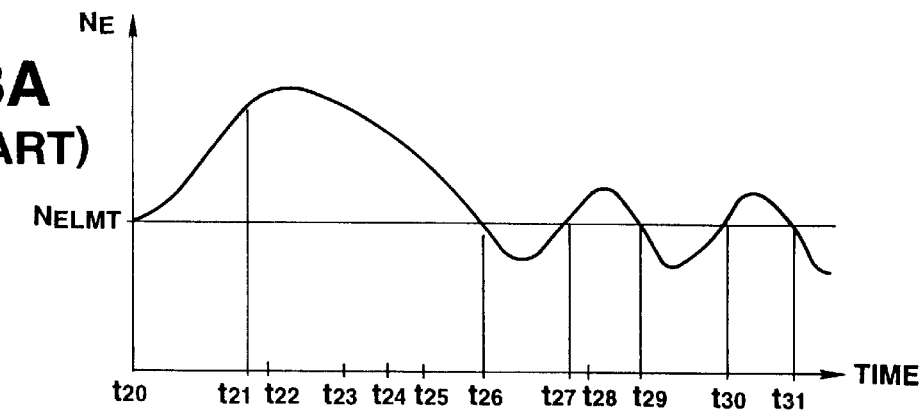
FIGS. 8A, 8B and 8C are timing charts showing the operation of the prior art traction control.
Figure 8B:
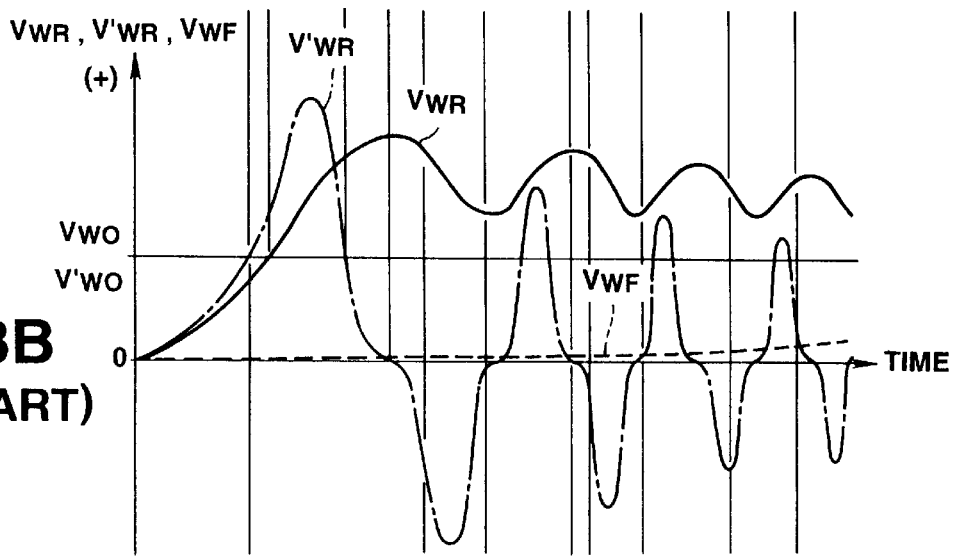
Figure 8C:
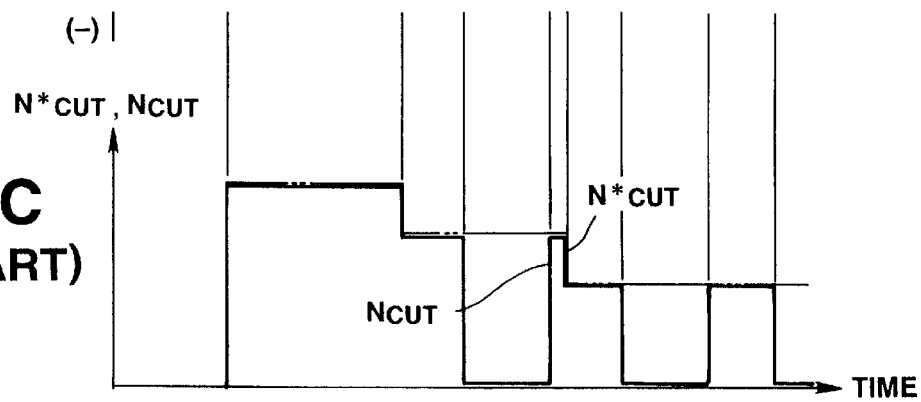

Hereinbelow described in detail by reference to the timing charts shown in FIGS. 8A to AC is the operation of the prior art traction control system, for the purpose of good understanding of the advantage of the system of the invention. Briefly speaking, the prior art traction control system which performs the operation shown in FIGS. 8A to 8C, in that the prior art system does not have the two steps S4 and S5 as shown in FIG. 4 and thus the minimum target drive-wheel speed $V_{WO}$ is fixed at a preset value (a constant value). Also, the simulation conditions indicated in FIGS. 8A to 8C are essentially identical to those indicated in FIGS. 7A to 7C. Suppose that the coolant temperature $T_W$ has been held at a constant value (a specified low temperature) for a while (for the time interval between $t_{20}$ and $t_{31}$) when starting with the cold engine and thus the engine-stall prevention minimum engine revolution speed $N_{ELMT}$ is also fixed at a certain constant value enough to maintain the idle speed at the specified low coolant temperature. On the other hand, let us suppose that the minimum target drive-wheel speed $V_{WO}$ is fixed at a comparatively small value such as the warm-engine idle speed or more necessary to maintain the idle speed during warm-up period of the engine.

Until the time $t_{20}$, the engine speed $N_E$ is maintained at the engine-stall prevention minimum engine revolution speed $N_{ELMT}$. At the time $t_{20}$, when the vehicle is quickly started with the accelerator pedal greatly depressed by the driver, the engine speed $N_E$ begins to gradually increase with a slight phase lag. The mean rear-wheel positive region according to the increase in the engine power, whereas the mean rear-wheel speed $V_{WR}$ increases gradually with a phase lag with respect to the mean rear-wheel acceleration $V'_{WR}$. At the beginning of starting (see the period of time between $t_{20}$ and $t_{21}$), in the same manner as the time period between $t_{00}$ and $t_{01}$ in FIGS. 7A to 7C, since the vehicle does not move irrespective of the increase in the mean rear-wheel speed ($V_{WR}$) and acceleration ($V'_{WR}$) and however the rear road wheels (the drive wheels) begin to slip or spin on the low-$\mu$ road, the mean front-wheel speed $V_{WF}$ doe s not almost increase. For the time period of $t_{20}$ and $t_{21}$, the mean rear-wheel speed $V_{WR}$ as well as the mean front-wheel speed $V_{WF}$ do not yet reach the above-mentioned minimum target drive-wheel speed $V_{WO}$. The target number $N^*_{CUT}$ of fuel-cut cylinders may be set at "0", since the slip amount, estimated as the difference between the mean rear-wheel speed and the target minimum drive-wheel speed, is negative. Thus, the engine control unit does not execute any fuel-cut control operation for each engine cylinder, for the time period between $t_{20}$ and $t_{21}$. Owing to the comparatively smaller values $V_{WO}$ and $V'_{WO}$ of the timing charts of FIGS. 8A to 8C which are set at smaller values than the two values $V_{WO}$ and $V'_{WO}$ of the timing charts of FIGS. 7A to 7C, the mean rear-wheel acceleration $V'_{WR}$ exceeds the minimum target drive-wheel acceleration $V'_{WO}$ at an earlier timing (at the time $t_{21}$) than the time $t_{11}$. Then, the mean rear-wheel acceleration $V'_{WR}$ continues to increase. Soon (at the time $t_{22}$ just after the time $t_{21}$) the mean rear-wheel speed $V_{WR}$ exceeds the minimum target drive-wheel speed $V_{WO}$. Under these conditions, the prior art traction control system may decide that the number of fuel-cut cylinders is "4", for example. Therefore, the engine control unit will execute the fuel-cut control action to all of the engine cylinders. In such a case, the actual number $N_{CUT}$ of fuel-cut cylinders it identical to the target number $N^*_{CUT}$. Owing to the fuel-cut control action made to all of the cylinders, the increasing rate of the engine speed $N_E$ reduces rapidly and shortly turns the decreasing tendency. Thereafter, the mean rear-wheel acceleration $V'_{WR}$ reduces again to a value less than the minimum target drive-wheel speed $V'_{WO}$ at the time $t_{23}$. On the other hand, the mean rear-wheel speed $V_{WR}$ continues to increase with a phase lag with respect to the mean rear-wheel acceleration $V'_{WR}$ and then begins to decrease from the time $t_{24}$ when the mean rear-wheel acceleration $V'_{WR}$ becomes zero. As a result, just after the time $t_{25}$ the slip amount S calculated becomes a positive value and the differentiated value (dS/dt) becomes a negative value, with the result that the target number $N^*_{CUT}$ of fuel-cut cylinders may be set at a positive integer for example "3". At this time, since the engine speed $N_E$ is maintained greater than the engine-stall prevention minimum engine revolution speed $N_{ELMT}$, the actual number $N_{CUT}$ of fuel-cut cylinders is identical to the current target number "3". Although the mean rear-wheel acceleration $V'_{WR}$ decreases greatly within the negative region from the time $t_{24}$ due to the so-called back torque adjusted at an excessively large value, Its decreasing rate reduces shortly. From the substantially middle of $t_{25}$ and $t_{26}$, the mean rear-wheel acceleration $V'_{WR}$ tends to increase again. On the other hand, the mean rear-wheel speed $V_{WR}$ continues to decrease greatly with the phase lag and thus the engine speed $N_E$ also continues to reduce. Under these conditions, the engine power is wastfully consumed for the rear drive heels 10RL and 10RR to slip. Therefore, although the mean rear-wheel speed $V_{WR}$ itself gets nearer to the minimum target drive-wheel speed $V_{WO}$, the rotational inertia of the drive wheels is not yet converged to its stable region (a proper moment of inertia) enough to smoothly move or drive the vehicle body, and as a result the mean front-wheel speed $V_{WF}$ (regarded as being equivalent to the vehicle speed) does not almost increase. On the other hand, the engine speed $N_E$, continuing to decrease greatly, has fallen below the engine-stall prevention minimum engine revolution speed $N_{ELMT}$ at the time $t_{26}$, Thus, in order to avoid undesired engine stall the engine control unit cancels the fuel-cut control action executing in accordance with the target number $N^*_{CUT}$ (the fuel-cut requirement instructed by the prior art traction control unit) theretofore, and in lieu thereof initiates the recovery control for delivery of fuel to all of the cylinders. At this time, since the throttle opening remains great with the accelerator pedal depressed, the engine speed $N_E$ has increased rapidly, while the mean rear-wheel acceleration $V'_{WR}$ has increased greatly and rapidly within the positive region. The mean rear-wheel speed $V_{WR}$ has also increased greatly with a slight phase lag. Until just after the time $t_{27}$, supposing that the target number $N^*_{CUT}$ of fuel-cut cylinders is continuously maintained at "3" on the basis of both the values $V_{WR}$ (related to the slip amount S) and $V'_{WR}$ (related to the differentiated value dS/dt of the slip amount), the target number $N^*_{CUT}$ of fuel-out cylinders may become equal again to the actual number $N_{CUT}$ just at the time $t_{27}$ when the engine speed $N_E$ exceeds the engine-stall prevention minimum engine revolution speed $N_{ELMT}$. As a consequence, the increasing rate of the engine speed $N_E$, the mean rear-wheel acceleration $V'_{WR}$ and the mean rear-wheel speed $V_{WR}$ all reduces greatly and rapidly after the time $t_{27}$. Owing to reduction in the values $V_{WR}$ and $V'_{WR}$, at the time $t_{28}$, the calculated target number $N^*_{CUT}$ of fuel-cut cylinders is updated by a positive integer such as "2" smaller than the previous value "3". Owing to the drop in the engine speed $N_E$, suppose that the engine speed $N_E$ has fallen again below the engine-stall prevention minimum engine revolution speed $N_{ELMT}$ at the time $t_{29}$. Thus the recovery control action begins again just after the time $t_{29}$. Subsequently to the recovery control action, the fuel-cut control action is initiated again at the time $t_{30}$ when the engine speed $N_E$ becomes again above the engine-stall prevention minimum engine revolution speed $N_{ELMT}$. Thereafter, at the time $t_{31}$, the recovery control action is initiated again. In this manner, owing to repetition of the fuel-cut control action and the recovery control action, for the time period between $t_{26}$ and $t_{31}$, takes place comparatively great positive and negative fluctuations in both the mean rear-wheel speed $V_{WR}$ and the mean rear-wheel acceleration $V'_{WR}$. Such undesired hunting promotes positive and negative fluctuations in the rotational inertia of the rear drive wheels 10RL and 10RR, thus deteriorating convergence of the rotational inertia to its stable region (a proper moment of inertia) enough to get a good traction or grip on the low-$\mu$ road. During hunting, the engine power is wastefully consumed to slip the rear drive wheels, without smoothly moving the vehicle. In this case, the mean front-wheel speed $V_{WF}$ (equivalent to the vehicle speed) does not almost increase even at the time $t_{31}$.

As set out above, in the case that the minimum target drive-wheel speed $V_{WO}$ (fixed at the warm-engine idle speed or more) is preset at a value less than a drive-wheel speed equivalent to the engine-stall prevention minimum engine revolution speed $N_{ELMT}$ (based on the coolant temperature $T_W$), there is a risk of stalling the engine instead of a rapid avoidance of the instantaneous acceleration slip, and additionally the undesired hunting (repetition of fuel-cut and recovery control actions) as previously explained tends to occur. On the contrary, in the case of the traction control system of the invention, the minimum target drive-wheel speed $V_{WO}$ is set at a value above a drive-wheel speed equivalent to the engine-stall prevention minimum engine revolution speed $N_{ELMT}$ properly determined depending on the coolant temperature $T_W$, thereby avoiding undesired hunting.

Figure 9:
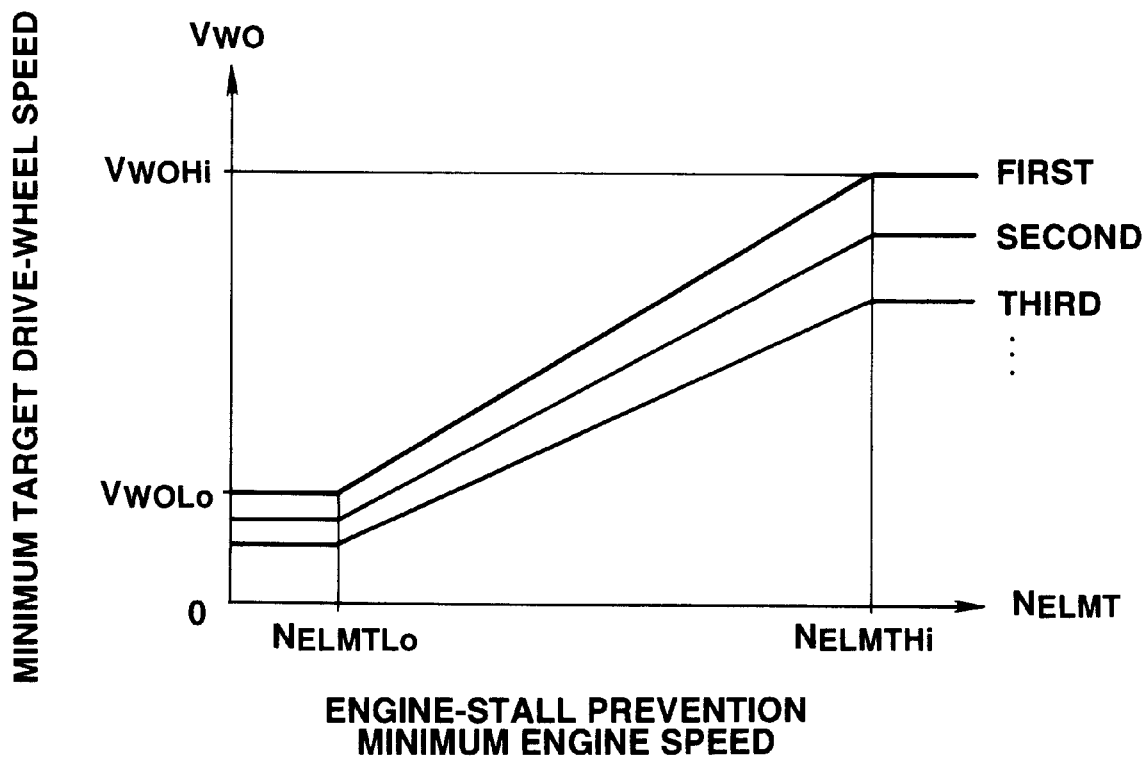
FIG. 9 is a control map (or a look-up table) showing another example of the minimum target drive-wheel speed ($V_{WO}$) which is derived depending upon both the engine-stall prevention minimum engine revolution speed ($N_{ELMT}$) and the gear ratio (for instance depending on whether the transmission is in first-speed gear, second-speed gear or third-speed gear).

In case of the previously-noted arithmetic processing shown in FIG. 4, although the minimum target drive-wheel speed $V_{WO}$ is derived from the engine-stall prevention minimum engine revolution speed $N_{ELMT}$ determined depending on the coolant temperature $T_W$, it will be appreciated that the minimum target drive-wheel speed $V_{WO}$ may be derived directly from the coolant temperature $T_W$ by reference to the look-up table as shown in FIG. 6, for example. Furthermore, in the above-mentioned arithmetic processing shown in FIG. 4 is exemplified in case of the starting period of the vehicle at the first-speed gear with the cold engine. Therefore, in consideration of only the first-gear speed, the engine-stall prevention minimum engine revolution speed ($N_{ELMT}$) versus minimum target drive-wheel speed ($V_{WO}$) characteristic (see FIG. 5) or the coolant temperature ($T_W$) versus minimum target drive-wheel speed ($V_{WO}$) characteristic (see FIG. 6) is determined. However, the characteristic suitable for the first-speed gear is improper in case that the vehicle starts at the second-speed gear on low-$\mu$ roads such as snow or icy roads. Also, there is a possibility that the gear ratio remains higher than the second-speed gear due to the response time delay of the automatic transmission even if the vehicle speed falls to or below the minimum target drive-wheel speed during the straight-ahead driving at the gear ratio higher than the second-speed gear, automatically selected in the vehicle with an automatic transmission. Under such a condition, in the event that the vehicle is rapidly accelerated with the accelerator pedal depressed, the characteristics as shown in FIGS. 5 and 6 are not suitable for selection of the minimum target drive-wheel speed $V_{WO}$ at the second-speed gear or higher gear ratio. It is preferable to more precisely determine the minimum target drive-wheel speed $V_{WO}$, further considering the selected gear ratio as a new parameter, as shown in FIG. 9.

Figure 10:
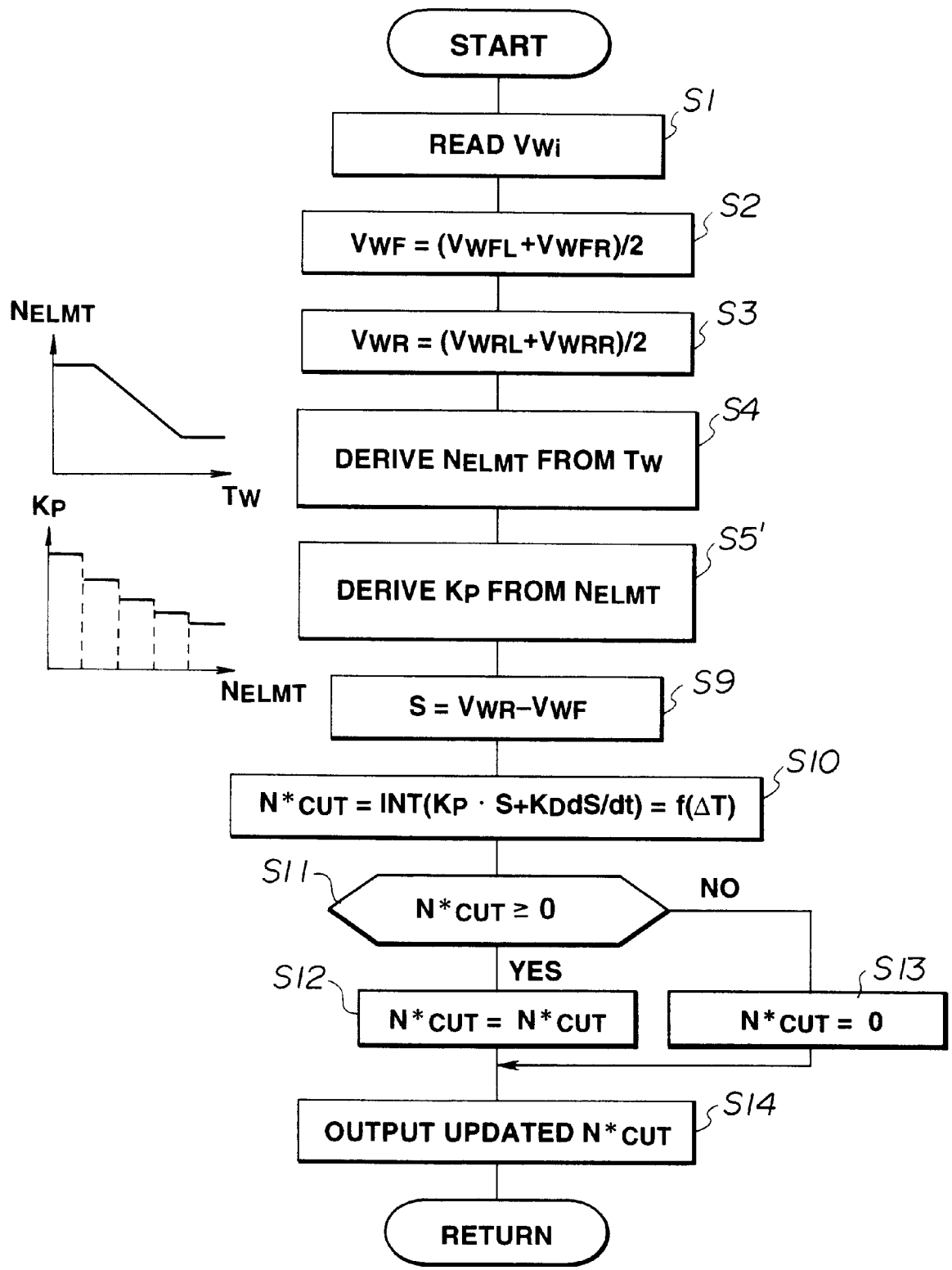
FIG. 10 is a flow chart illustrating another arithmetic processing for the traction control which is executed by the traction control unit shown in FIG. 3.

FIG. 10 shows another arithmetic processing which may be executed by the traction control unit 30 for computing the target number $N^*_{CUT}$ of fuel-cut cylinders, in lieu of the arithmetic processing of FIG. 4. The arithmetic processing of FIG. 10 is slightly different from that of FIG. 4 in that step S5 is replaced with step S5' and steps S6, S7 and S8 are canceled. Briefly, the arithmetic processing of FIG. 4 is directed to a good computation of the target number $N_{*CUT}$ of fuel-cut cylinders by properly setting the minimum target drive-wheel speed $V_{WO}$, certainly avoiding the risk of stalling the engine. On the other hand, the other arithmetic processing of FIG. 10 is directed to a good computation of the target number $N^*_{CUT}$ by properly setting the two control gains, namely the proportional gain Kp for the slip amount S and the differential gain $K_D$ for the differentiated value dS/at of the slip amount, certainly avoiding the risk of stalling the engine.

Figure 11:
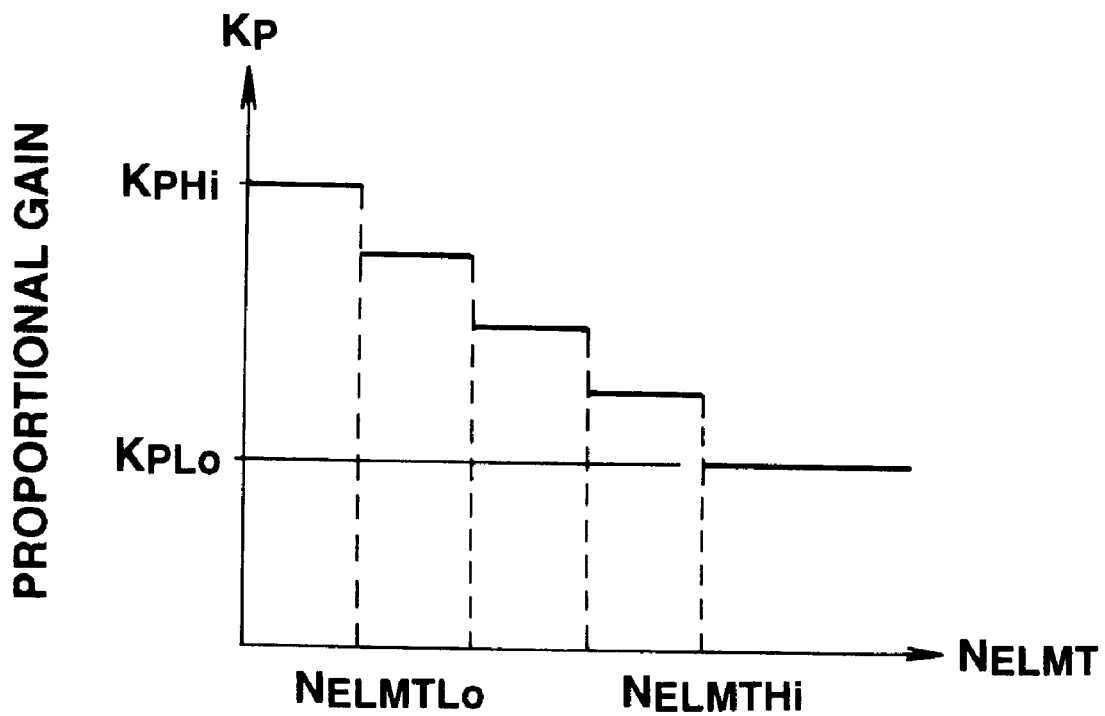
FIG. 11 is a control map (or a look-up table) showing one example of a proportional gain (Kp) which is derived depending upon the engine-stall prevention minimum engine revolution speed ($N_{ELMT}$) through the arithmetic processing shown in FIG. 10.

In step S5', the proportional gain Kp (see stop S10 or the expression (9)) is derived from the engine-stall prevention minimum engine revolution speed $N_{ELMT}$ by reference to the engine-stall prevention minimum engine revolution speed ($N_{ELMT}$) versus proportional gain (Kp) characteristic shown in FIG. 11. As seen in FIG. 11, the proportional gain Kp is set at a predetermined minimum value $Kp_{Lo}$ within a higher region of the engine-stall prevention minimum engine revolution speed $N_{ELMT}$ above a predetermined upper threshold $N_{ELMTHi}$, and set at a predetermined maximum value $Kp_{Hi}$ within a lower region of the engine-stall prevention minimum engine revolution speed $N_{ELMT}$ below a predetermined lower threshold $N_{EMLTLo}$. The proportional gain Kp is designed to reduce in a stepwise manner in accordance with the increase in the engine-stall prevention minimum engine revolution speed $N_{ELMT}$ within the intermediate region defined between the higher and lower regions. As may be appreciated from a combination of the data map (related to step S5') shown in FIG. 11 and the data map (related to step S4) shown in FIG. 2, the proportional gain Kp is designed to set at the predetermined maximum value $Kp_{Hi}$ within the high-temperature region above the predetermined high temperature value +Two, and to set at the predetermined minimum value $Kp_{Lo}$ within the low-temperature region below the predetermined low temperature value −Two, and to increase stepwise in accordance with the increase in the coolant temperature $T_W$. That is, the proportional gain Kp is used as a variable which varies depending on the coolant temperature $T_W$. In other words, the proportional gain Kp varies essentially in proportion to the coolant temperature $T_W$, so that the target number $N^*_{CUT}$ of fuel-cut cylinders is effectively reduced during the cold-engine idling, as compared with during the hot-engine idling, so as to prevent the engine from stalling during the traction control irrespective of whether the engine is cold or hot. Therefore, in step S10 following steps S5' and S9, assuming that the same slip amount S takes place, the higher the coolant temperature $T_W$, the greater the calculated target number $N^*_{CUT}$ of fuel-cut cylinders. Tn other words, if the same slip amount occurs, the lower the coolant temperature $T_W$, the smaller the calculated target number $N^*_{CUT}$ of fuel-cut cylinders. On the other hand, the differential gain $K_D$ for the differentiated value (dS/dt) is fixed at a proper constant value regardless of the coolant temperature $T_W$, and thus the calculated target number $N^*_{CUT}$ tends to increase according to the increase in the differentiated value (dS/dt) of the slip amount S. The fundamental principle of the other arithmetic processing of FIG. 10 will be herebelow described in detail.

It is desired that the differential gain $K_D$ for the differentiated value (dS/dt) of the slip amount is preset at a permissible great value as much as possible in order to provide a high response of the traction control and consequently to rapidly and greatly decrease the driving torque delivered to the rear drive wheels, when the differentiated value dS/dt (the rate-of-change in the slip amount S) is just increasing within the positive region. On the other hand, there is a possibility of the engine stall owing to the fuel-cut control action under the following conditions in which the differentiated value dS/dt of the slip amount is zero or less, and also the slip amount S reduces in the direction of convergence. For instance, in the event that the differentiated value dS/dt is not so little owing to the rotational inertia of the power train Irrespective of execution of the fuel-cut control action when quickly starting on a very low-$\mu$ road, the slip amount S cannot be easily reduced, and thus the drive-wheel slip may continue for a while. Under such a condition when the rear drive-wheel speed $V_{wR}$ slows down rapidly by a great back-torque caused by the engine braking, there is a risk of engine stall. Also, the drive wheels tend to slip owing to excessive engine power delivered to the drive wheels at the beginning of occurrence of acceleration-slip on a road surface of not so low friction coefficient. Due to such a wheel spin or slip, the traction control is initiated and thus the mean rear-wheel speed $V_{WR}$ (essentially equivalent to the drive-wheel speed) reduces, thus allowing the rotational inertia of the drive wheels to converge within toward the stable region enough to smoothly effectively move the vehicle by the reaction force from the road surface. Thereafter, if the aforementioned reaction force develops rapidly, the mean rear-wheel speed $V_{WR}$ may drop rapidly, thereby resulting in the engine stall. That is, in case that the mean rear-wheel speed $V_{WR}$ falls rapidly, indeed there is the risk of stalling the engine. Under such a particular condition of the previously-discussed increased engine-stall tendencies, the mean rear-wheel acceleration $V'_{WR}$ (essentially equivalent to the drive-wheel acceleration) often recovers from a negative value of a comparatively great absolute value to zero or a negative value of a comparatively small absolute value. Under these circumstances, the computed result of the target number $N^*_{CUT}$ of fuel-out cylinders is affected mainly by the slip amount S and its proportional gain Kp. In other words, undesired engine stall can be avoided by proper setting of the proportional gain Kp. For the reasons set out above, in the arithmetic processing shown in FIG. 10, under a first circumstance of the increased engine-stall tendency when the coolant temperature $T_W$ is above the predetermined high temperature +Two and the engine-stall prevention minimum engine revolution speed $N_{ELMT}$ is below the predetermined lower threshold $N_{ELMTLo}$ the proportional gain Kp is set at the predetermined maximum value $Kp_{Hi}$, for the purpose of computing or determining the maximum permissible value of the target number $N^*_{CUT}$ of fuel-cut cylinders so that the engine speed $N_E$ does not fall below the engine-stall prevention minimum engine revolution speed $N_{ELMT}$. In contrast to the above, under a second circumstance of the increased engine-stall tendency when the coolant temperature $T_W$ is below the predetermined low temperature −Two and the engine-stall prevention minimum engine revolution speed $N_{ELMT}$ is above the predetermined upper threshold $N_{ELMTHi}$, the proportional gain Kp is set at the predetermined minimum value $Kp_{Lo}$, for the purpose of computing or determining the maximum permissible value of the target number $N^*_{CUT}$ of fuel-cut cylinders 80 that the engine speed $N_E$ does not fall below the engine-stall prevention minimum engine revolution speed $N_{ELMT}$. In case of the circumstances represented by the two inequalities −Two<$T_W$<+Two and $N_{ELMTLo}$<$N_{ELMT}$<$N_{ELMTHi}$, the proportional gain Kp is set at a maximum permissible value suitable for computing or estimating a maximum permissible value of the target number $N^*_{CUT}$ of fuel-cut cylinders so that the engine speed $N_E$ does not fall below the engine-stall prevention minimum engine revolution speed $N_{ELMT}$ by reference to the look-up table shown in FIG. 11. Thus, there is no possibility that the engine speed $N_E$ is below the engine-stall prevention minimum engine revolution speed $N_{ELMT}$ (determined depending upon the coolant temperature $T_W$) even If the engine control unit executes the fuel-cut control action in response to the target number $N^*_{CUT}$ computed by the traction control unit through the arithmetic processing of FIG. 10 at any slip amount S and any differentiated value dS/dt. On the other hand, as previously explained, the differential gain $K_D$ for the differentiated value dS/dt of the slip amount is preset at a permissible great value, and thus the target number $N^*_{CUT}$ of fuel-cut cylinders may be set at a relatively great value when the differentiated value dS/dt increases greatly. In such a case, adequate back-torque can act on the drive wheels, thereby certainly converging or reducing the acceleration-slip, while keeping the engine speed $N_E$ greater than the engine-stall prevention minimum engine revolution speed $N_{ELMT}$. In the same manner as the arithmetic processing of FIG. 4, the arithmetic processing of FIG. 10 eliminates the possibility of repetition of the fuel-cut control action and the recovery control action, thus avoiding unstable behavior of the vehicle during the traction control. As appreciated from step S9, in the arithmetic processing of FIG. 10, since the slip amount S is calculated as the difference ($V_{WR}$−$V_{WO}$) between the mean rear-wheel speed $V_{WR}$ and the mean front-wheel speed $V_{WR}$, a target rear-wheel speed (corresponding to the minimum target drive-wheel speed $V_{WO}$) is permanently at the mean front-wheel speed $V_{WF}$. Therefore, when the vehicle does not adequately move at the beginning of starting period, the target rear-wheel speed becomes essentially zero. Under this circumstance, the slip amount S and its differentiated value dS/dt, both obtained through the processing of FIG. 10, tend to be greater than those obtained through the processing of FIG. 4. This may result in the increased target number $N^*_{CUT}$, as compared with the arithmetic processing of FIG. 4. To avoid this, at least the proportional gain Kp must be set at a smaller value than that used in the processing of FIG. 4. In case of the processing of FIG. 10, since the slip amount S is calculated only as the difference between the mean rear-wheel speed and the mean front-wheel speed irrespective of whether the vehicle is in the steady running state at a vehicle speed above a predetermined value essentially equivalent to the minimum target drive-wheel speed $V_{WO}$ or the vehicle accelerates at a low speed below the predetermined value for example during starting period, the processing of FIG. 10 is inferior to the processing of FIG. 4, in terms of the response of the traction control during the starting period. The processing of FIG. 10 may ensure a high convergence performance of the drive-wheel slip, once the vehicle begins to run.

As will be appreciated from the above, according to the traction control system which executes the arithmetic processing as shown in FIG. 4, a target drive-wheel speed (essentially corresponding to a minimum target drive-wheel speed $V_{WO}$) necessary to or enough to attain a minimum internal combustion engine revolution speed (essentially corresponding to an engine-stall prevention minimum engine revolution speed $N_{ELMT}$) can be properly set depending upon at least an internal combustion engine temperature (essentially corresponding to an engine-coolant temperature $T_W$). Even if the drive-wheel speed approaches or reaches the target drive-wheel speed based on the engine temperature, there is no risk of stalling the engine or the engine is not likely to stall, irrespective of whether the engine is cold or warm. Thus, in the electronically controlled engine in which an engine combustion condition can be forcibly controlled through a fuel-out control operation or a decreasing control of fuel-delivery amount for designated engine cylinders, the traction control system of the invention eliminates the necessity for the fuel-injection recovery control from the fuel-cut state to the combusting state, and thus avoids repetition of the fuel-cut control action and the recovery control action, and whereby undesired hunting phenomenon is prevented.

According to the traction control system which executes the arithmetic processing as shown in FIG. 10, control gains (essentially corresponding to a proportional gain Kp of the slip amount S and/or a differential gain $K_D$ of the differentiated value dS/dt of the slip amount S) necessary to or enough to attain a minimum internal combustion engine revolution speed (essentially corresponding to an engine-stall prevention minimum engine revolution speed $N_{ELMT}$) can be properly set depending upon at least an internal combustion engine temperature (essentially corresponding to an engine-coolant temperature $T_W$). When the fuel-cut operation or the decrement of fuel-delivery amount is controlled by the control gains based on the engine temperature, there is no risk of stalling the engine or the engine is not likely to stall, irrespective of whether the engine is cold or warm. Thus, the system which executes the arithmetic processing shown in FIG. 10 can provide the same effects as the system which executes the arithmetic processing shown in FIG. 4. That is, the undesired hunting can be avoided, thereby ensuring a stable behavior of the vehicle during the traction control.

In the previously discussed embodiments, although the traction control system utilizes the fuel-out control action to provide a proper traction, the so-called fuel-supply control type traction control system using the fuel-cut control action may be combined with a braking-force adjustment type traction control system or a throttle-opening control type traction control system so as to provide a more precise traction control. In the embodiments, although the driven-wheel speed is used as the vehicle speed, a so-called pseudo vehicle speed (or an estimated vehicle speed), which is often used in an anti-skid control system and often selected as the highest one of four wheel speeds for example, may be used as the vehicle speed for the purpose of calculation of the slip amount of the drive wheel. Although the traction control system of the embodiments is exemplified in case of rear-wheel-drive vehicles, the system of the invention may be applied to a front-wheel-drive vehicle or to a four-wheel-drive vehicle. In case of the four-wheel-drive vehicle, the pseudo vehicle speed may be used for deriving a speed equivalent to the actual vehicle speed and for deriving the slip amount of each of drive wheels from the pseudo vehicle speed and each of the wheel speeds.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automotive traction control system in combination with a fuel-supply system for adjusting engine power by a fuel-cut control action or a decrease in a fuel-supply amount, said traction control system comprising:

first sensor means for monitoring wheel speeds ($V_{WFL}$, $V_{WFR}$, $V_{WRL}$, $W_{WRR}$) of road wheels;

means for estimating a vehicle speed from the wheel speeds;

means for monitoring a slipping condition of a drive wheel of the road wheels;

engine control means cooperating with the fuel-supply system, for decreasing the engine power during acceleration-slip control by the fuel-cut control action or the decrease in the fuel-supply amount delivered to an internal combustion engine, in response to the slipping condition;

second sensor means for detecting an internal combustion engine temperature;

means for determining an engine-stall prevention minimum engine revolution speed ($N_{ELMT}$) that maintains rotation of the internal combustion engine without engine stall, depending on the internal combustion engine temperature;

means for determining a minimum target drive-wheel speed ($V_{WO}$) necessary to attain the engine-stall prevention minimum engine revolution speed ($N_{ELMT}$), depending on the internal combustion engine temperature;

means for setting a target drive-wheel speed at the minimum target drive-wheel speed ($V_{WO}$), when the vehicle speed is below the minimum target drive-wheel speed ($V_{WO}$); and said engine control means executing the acceleration-slip control so that a speed of the drive wheel is adjusted to the target drive-wheel speed set at the minimum target drive-wheel speed ($V_{WO}$), when the vehicle speed is below the minimum target drive-wheel speed ($V_{WO}$).

2. The automotive traction control system as claimed in claim 1, wherein the internal combustion engine temperature is an engine coolant temperature.

3. An automotive traction control system in combination with a fuel-supply system for adjusting engine power by a fuel-cut control action or a decrease in a fuel-supply amount, said traction control system comprising:

means for monitoring a slipping condition of a drive wheel;

engine control means cooperating with the fuel-supply system, for decreasing the engine power by the fuel-cut control action or the decrease in the fuel-supply amount delivered to an internal combustion engine, in response to the slipping condition;

sensor means for detecting an internal combustion engine temperature;

means for determining an engine-stall prevention minimum engine revolution speed ($N_{ELMT}$) that maintains rotation of the internal combustion engine without engine stall, depending on the internal combustion engine temperature; and means for arithmetically calculating a control gain (Kp) of said engine control means from the engine-stall prevention minimum engine revolution speed ($N_{ELMT}$) based on the internal combustion engine temperature, so that a level of the fuel-cut control action or a level of the decrease in the fuel-supply amount is decreased as the internal combustion temperature decreases.

4. The automotive traction control system as claimed in claim 3, wherein the internal combustion engine temperature is an engine coolant temperature.

5. An automotive traction control system in combination with a fuel-supply system for adjusting engine power by a fuel-cut control action, said traction control system comprising:

means for monitoring a drive-wheel speed;

means for calculating a slip amount of the drive wheel as a difference between the drive-wheel speed and a target drive-wheel speed;

engine control means cooperating with the fuel-supply system, for decreasingly compensating for the engine power in response to a target number of fuel-cut cylinders which are subjected to the fuel-cut control action;

sensor means for detecting an internal combustion engine temperature;

means for determining an engine-stall prevention minimum engine revolution speed ($N_{ELMT}$) that maintains rotation of the internal combustion engine without engine stall, depending on the internal combustion engine temperature; and computation means for computing the target number of fuel-cut cylinders through a proportional plus derivative control action based on the slip amount and a differentiated value of the slip amount; and means for arithmetically calculating a proportional gain (Kp) for the proportional plus derivative control action from the engine-stall prevention minimum engine revolution speed ($N_{ELMT}$) based on the internal combustion engine temperature, so that a level of the fuel-cut control action is decreased as the internal combustion temperature decreases.

6. The automotive traction control system as claimed in claim 5, wherein the internal combustion engine temperature is an engine coolant temperature.

7. An automotive traction control system in combination with a fuel-supply system for adjusting engine power by a fuel-cut control action or a decrease in a fuel-supply amount, said traction control system comprising:

wheel-speed sensors monitoring wheel speeds of road wheels;

an engine temperature sensor monitoring an internal combustion engine temperature;

an engine control unit configured to be connected to the fuel-supply system, for decreasing the engine power during acceleration-slip control by the fuel-cut control action or the decrease in the fuel-supply amount delivered to an internal combustion engine, in response to a slip amount of a drive wheel, said engine control unit comprising (1) an arithmetic-calculation section estimating a vehicle speed from the wheel speeds, (2) an arithmetic-calculation section calculating the slip amount of the drive wheel from the wheel speeds, (3) an arithmetic-calculation section determining an engine-stall prevention minimum engine revolution speed ($N_{ELMT}$) that maintains rotation of the internal combustion engine without engine stall, depending on the internal combustion engine temperature, (4) an arithmetic-calculation section determining a minimum target drive-wheel speed ($V_{WO}$) necessary to attain the engine-stall prevention minimum engine revolution speed ($N_{ELMT}$), depending on the internal combustion engine temperature, (5) an arithmetic-and-logic section setting a target drive-wheel speed at the minimum target drive-wheel speed ($V_{WO}$), when the vehicle speed is below the minimum target drive-wheel speed ($V_{WO}$), and (6) a control section executing the acceleration-slip control so that a speed of the drive wheel is adjusted to the target drive-wheel speed set at the minimum target drive-wheel speed ($V_{WO}$), when the vehicle speed is below the minimum target drive-wheel speed ($V_{WO}$).

8. The automotive traction control system as claimed in claim 7, wherein the minimum target drive-wheel speed ($V_{WO}$) is set at a predetermined lower limit ($V_{WOLo}$) within a high-temperature region above a predetermined high engine temperature value ($+T_{WO}$), and set at a predetermined upper limit ($V_{WOHi}$) within a low-temperature region below a predetermined low engine temperature value ($-T_w$), and linearly decreased in proportion to an increase in the internal combustion engine temperature ($T_w$) within an intermediate region defined between the predetermined high and low engine temperature values ($\pm T_{WO}$).

9. An automotive traction control system in combination with a fuel-supply system for adjusting engine power by a fuel-cut control action or a decrease in a fuel-supply amount, said traction control system comprising:

wheel-speed sensors monitoring wheel speeds of road wheels;

an engine temperature sensor monitoring an internal combustion engine temperature;

an engine control unit configured to be connected to the fuel-supply system, for decreasing the engine power by the fuel-cut control action or the decrease in the fuel-supply amount delivered to an internal combustion engine, in response to a slip amount of a drive wheel; said engine control unit comprising (1) an arithmetic-calculation section calculating the slip amount of the drive wheel from the wheel speeds, (2) an arithmetic-calculation section determining an engine-stall prevention minimum engine revolution speed ($N_{ELMT}$) that maintains rotation of the internal combustion engine without engine stall, depending on the internal combustion engine temperature, and (3) an arithmetic-calculation section calculating a control gain (Kp) of the engine control unit from the engine-stall prevention minimum engine revolution speed ($N_{ELMT}$) based on the internal combustion engine temperature, so that a level of the fuel-cut control action or a level of the decrease in the fuel-supply amount is decreased as the internal combustion temperature decreases.

10. The automotive traction control system as claimed in claim 9, wherein the control gain (Kp) is set at a predetermined minimum value ($Kp_{Lo}$) within a higher region of the engine-stall prevention minimum engine revolution speed ($N_{ELMT}$) above a predetermined upper threshold value ($N_{ELMTHi}$), and set at a predetermined maximum value ($Kp_{Hi}$) within a lower region of the engine-stall prevention minimum engine revolution speed ($N_{ELMT}$) below a predetermined lower threshold value ($N_{ELMTLo}$), and decreased in a stepwise manner in accordance with an increase in the engine-stall prevention minimum engine revolution speed ($_{ELMT}$) within an intermediate region defined between the higher and lower regions.

* * * * *